US011962798B2

(12) United States Patent
Lim et al.

(10) Patent No.: US 11,962,798 B2
(45) Date of Patent: *Apr. 16, 2024

(54) APPARATUS AND METHOD FOR ENCODING OR DECODING VIDEO USING ADAPTIVE MOTION VECTOR RESOLUTION

(71) Applicant: SK TELECOM CO., LTD., Seoul (KR)

(72) Inventors: Jeong-yeon Lim, Seoul (KR); Sun-young Lee, Seoul (KR); Se-hoon Son, Seoul (KR); Jae-seob Shin, Seoul (KR); Hyeong-duck Kim, Suwon-si (KR); Gyeong-taek Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 58 days.

This patent is subject to a terminal disclaimer.

(21) Appl. No.: 17/141,691

(22) Filed: Jan. 5, 2021

(65) Prior Publication Data

US 2021/0127131 A1    Apr. 29, 2021

Related U.S. Application Data

(63) Continuation of application No. 16/343,164, filed as application No. PCT/KR2017/011484 on Oct. 17, 2017, now Pat. No. 10,924,757.

(30) Foreign Application Priority Data

Oct. 19, 2016  (KR) .................. 10-2016-0136066
Feb. 27, 2017  (KR) .................. 10-2017-0025673

(51) Int. Cl.
*H04N 19/52*      (2014.01)
*H04N 19/119*     (2014.01)
(Continued)

(52) U.S. Cl.
CPC ............ *H04N 19/52* (2014.11); *H04N 19/119* (2014.11); *H04N 19/139* (2014.11); *H04N 19/176* (2014.11)

(58) Field of Classification Search
CPC .. H04N 19/523; H04N 19/463; H04N 19/117; H04N 19/119; H04N 19/139;
(Continued)

(56) References Cited

U.S. PATENT DOCUMENTS 8,175,159 B2 *  5/2012  Suzuki .................. H04N 19/56
                                                375/240.15
9,154,806 B2    10/2015  Kim et al.
(Continued)

FOREIGN PATENT DOCUMENTS

KR    10-0704626 B1    4/2007
KR    10-1441874 B1    9/2014
(Continued)

OTHER PUBLICATIONS

International Search Report for PCT/KR2017/011484 dated Jan. 22, 2018, citing the above reference(s).
(Continued)

*Primary Examiner* — Tyler W. Sullivan
(74) *Attorney, Agent, or Firm* — Hauptman Ham, LLP

(57) ABSTRACT

A video decoding apparatus decodes a sequence of one or more pictures in the unit of blocks which are split from each picture. The apparatus comprising a decoder configured to reconstruct, from a bitstream, a current motion vector difference of the current block among the blocks which belong to the sequence of one or more pictures, and an image decoder configured to predict and decode the current block using the motion vector of the current block. When the current motion vector difference of the current block is zero, the resolution of the current motion vector difference of the (Continued)

current block is set to the ¼ pixel precision without the information on the motion vector resolution extracted.

7 Claims, 16 Drawing Sheets

(51) Int. Cl.
*H04N 19/139* (2014.01)
*H04N 19/176* (2014.01)

(58) Field of Classification Search
CPC .... H04N 19/176; H04N 19/46; H04N 19/517; H04N 19/52; H04N 19/80; H04N 19/91
See application file for complete search history.

(56) References Cited

U.S. PATENT DOCUMENTS

| | | | |
|---|---|---|---|
| 9,674,546 | B2 | 6/2017 | Lim et al. |
| 9,900,603 | B2* | 2/2018 | Sullivan ............... H04N 19/109 |
| 9,930,358 | B2 | 3/2018 | Kim et al. |
| 10,531,113 | B2 | 1/2020 | Lee et al. |
| 10,812,822 | B2* | 10/2020 | Rapaka ................. H04N 19/523 |
| 2006/0176957 | A1 | 8/2006 | Han et al. |
| 2010/0128223 | A1* | 5/2010 | Blumenthal ........... A61B 3/032 351/239 |
| 2012/0207220 | A1* | 8/2012 | Kim ..................... H04N 19/463 375/E7.193 |
| 2012/0219063 | A1 | 8/2012 | Kim et al. |
| 2012/0224635 | A1 | 9/2012 | Kim et al. |
| 2013/0182760 | A1* | 7/2013 | Sasai ..................... H04N 19/46 375/240.02 |
| 2015/0195562 | A1 | 7/2015 | Li et al. |
| 2016/0337661 | A1 | 11/2016 | Pang et al. |
| 2016/0337662 | A1* | 11/2016 | Pang .................. H04N 19/523 |
| 2017/0295370 | A1* | 10/2017 | Xu ..................... H04N 19/124 |
| 2017/0310961 | A1 | 10/2017 | Liu et al. |
| 2018/0077417 | A1* | 3/2018 | Huang .................. H04N 19/70 |
| 2018/0098089 | A1* | 4/2018 | Chen .................... H04N 19/70 |
| 2018/0242011 | A1 | 8/2018 | Kim et al. |
| 2018/0270485 | A1* | 9/2018 | Jang .................... H04N 19/503 |
| 2019/0320195 | A1 | 10/2019 | Lim et al. |
| 2020/0029091 | A1* | 1/2020 | Chien .................. H04N 19/103 |
| 2021/0329292 | A1* | 10/2021 | Jeong ..................... H04N 19/13 |

FOREIGN PATENT DOCUMENTS

| | | |
|---|---|---|
| KR | 10-2015-0090194 A | 8/2015 |
| KR | 10-2016-0106617 A | 9/2016 |
| WO | 2011/021913 A2 | 2/2011 |
| WO | 2011/021915 A2 | 2/2011 |
| WO | 2014/078068 A1 | 5/2014 |
| WO | 2014/078422 A1 | 5/2014 |
| WO | 2014/088772 A1 | 6/2014 |
| WO | 2014/109826 A1 | 7/2014 |
| WO | 2014/120367 A1 | 8/2014 |
| WO | 2014/120368 A1 | 8/2014 |
| WO | 2014/120369 A1 | 8/2014 |
| WO | 2014/120373 A1 | 8/2014 |
| WO | 2014/120374 A1 | 8/2014 |
| WO | 2014/120375 A2 | 8/2014 |
| WO | 2014/120575 A1 | 8/2014 |
| WO | 2014/120656 A1 | 8/2014 |
| WO | 2014/120960 A1 | 8/2014 |
| WO | 2014/120987 A1 | 8/2014 |
| WO | 2015/099814 A1 | 7/2015 |
| WO | 2015/099816 A1 | 7/2015 |
| WO | 2015/099823 A1 | 7/2015 |
| WO | 2015/106126 A1 | 7/2015 |
| WO | 2016/078599 A1 | 5/2016 |
| WO | WO-2018002024 A1 * | 1/2018 ........... H04N 19/139 |

OTHER PUBLICATIONS

Li, et al., "Adaptive motion vector resolution for screen content", Joint Collaborative Team on Video Coding (JCT-VC) of ITU-T SG 16 WP 3 and ISO/IEC JTC 1/SC 29/WG 11 19th Meeting: Strasbourg, FR, Oct. 17-24, 2014, Document: JCTVC-S0085_r1 (Year: 2014).
Joshi et al., "Proposed Editorial Improvements to High Efficiency Video Coding (HEVC) Screen Content Coding: Draft 2", Joint Collaborative Team on Video Coding (JCT-VC) of ITU-T SG 16 WP 3 and ISO/IEC JTC 1/SC 29/WG 11 20th Meeting: Geneva, Switzerland, Feb. 10-18, 2015, Document: JCTVC-T0031 (Year: 2015), p. 42.
Chinese Office Action dated Sep. 19, 2022, in connection with the Chinese Patent Application No. 201780064071.X, 20 pages, citing the above reference(s).

* cited by examiner

FIG. 5
Related Art

APPARATUS AND METHOD FOR ENCODING OR DECODING VIDEO USING ADAPTIVE MOTION VECTOR RESOLUTION

CROSS-REFERENCE TO RELATED APPLICATIONS

This application is a continuation of U.S. patent application Ser. No. 16/343,164, filed on Apr. 18, 2019, which is a National Phase of International Application No. PCT/KR2017/011484, filed on Oct. 17, 2017, which is based upon and claims the benefit of priorities from Korean Patent Application No. 10-2016-0136066, filed on Oct. 19, 2016, and Korean Patent Application No. 10-2017-0025673, filed on Feb. 27, 2017. The disclosures of the above-listed applications are hereby incorporated by reference herein in their entirety.

TECHNICAL FIELD

The present invention relates to efficient video encoding or decoding.

BACKGROUND ART

The information disclosed in this Background section is only for enhancement of understanding of the background of the invention and therefore it may contain information that does not form the prior art.

Video data consumes a large amount of data compared with audio data, still image data, or the like, and thus, many hardware resources including a memory are required to store or transmit the video data itself without a process for compression. Accordingly, in general, when video data is stored or transmitted, the video data is compressed and stored or transmitted using an encoding device, and a decoding device receives, decompresses, and reproduces the compressed video data. Such video compression technology includes high efficiency video coding (HEVC) established in early 2013 to enhance encoding efficiency by about 40% over H.264/AVC as well as H.264/AVC.

During inter prediction encoding, which is a prediction method for encoding or decoding, information on a residual block obtained by predicting a current block and motion information used to predict the current block are signaled to a decoding apparatus. Here, the motion information includes information on a reference picture used to predict the current block and information on a motion vector, and in the case of the legacy HEVC standard, a motion vector is represented in units of ¼-pixel.

However, the size and resolution of an image, and a frame rate are gradually increased, and accordingly, the amount of data to be encoded is also increased. Accordingly, there is a need for compression technology with higher efficiency than the legacy compression technology.

DISCLOSURE

Technical Problem

Therefore, the present invention has been made in view of the above problems, and it is one object of the present invention to provide video encoding or decoding technology for efficiently encoding a video by adjusting resolution of a motion vector depending on the characteristics of an image such as a change in an image or block size.

SUMMARY

In accordance with one aspect of the present invention, provided is a method of encoding a video, the method including determining a motion vector resolution of a current block, determining a motion vector of the current block according to the motion vector resolution of the current block, predicting and encoding the current block using the motion vector of the current block, and encoding information on the motion vector resolution of the current block.

In accordance with another aspect of the present invention, a video decoding method of adaptively determining a motion vector resolution of a current block and decoding the current block includes extracting information on the motion vector resolution of the current block from a bitstream and determining the motion vector resolution of the current block based on the information on the motion vector resolution of the current block, and predicting and decoding the current block using the motion vector of the current block, determined according to the motion vector resolution of the current block.

In accordance with another aspect of the present invention, a video decoding apparatus for adaptively determining motion vector resolution of a current block and decoding the current block includes a motion vector resolution decoder configured to extract information on the motion vector resolution of the current block from a bitstream and to determine the motion vector resolution of the current block based on the information on the motion vector resolution of the current block, and an video decoder configured to predict and decode the current block using the motion vector of the current block, determined according to the motion vector resolution of the current block.

DESCRIPTION OF DRAWINGS

FIG. 5 is a diagram illustrating interpolation and motion estimation procedure, which is performed by the inter predictor 124, and resolution of a reference picture.

DETAILED DESCRIPTION

Figure 1:
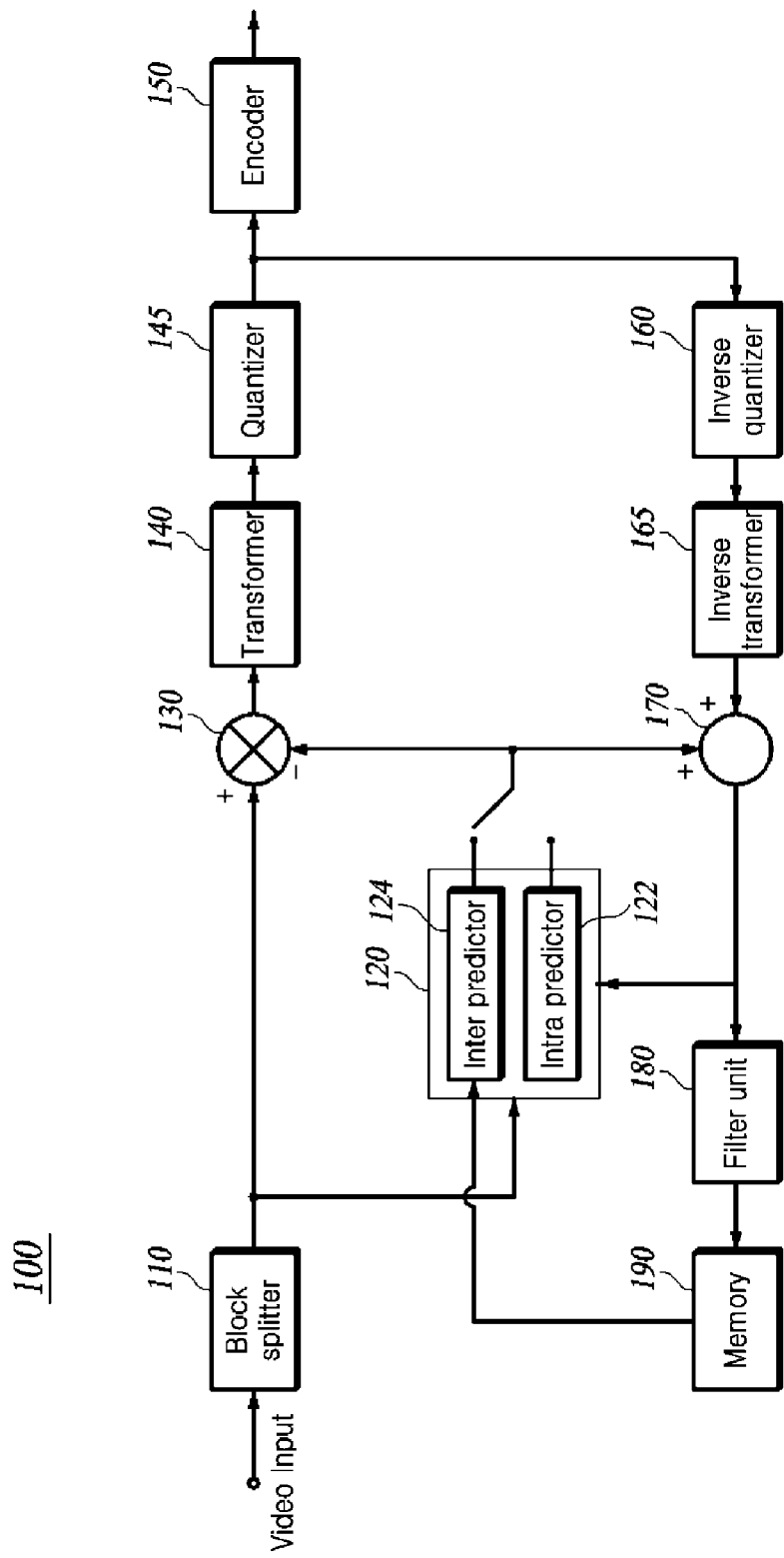
FIG. 1 is a schematic block diagram showing a general video encoding apparatus.

Hereinafter, some embodiments of the present invention will be described in detail with reference to the accompanying drawings. With regard to reference numerals of elements of the drawings, the same reference numerals designate the same element if possible although the elements are shown in different drawings. In addition, in the following description of the present invention, a detailed description of known functions and configurations incorporated herein will be omitted for clarity and brevity.

FIG. 1 is a schematic block diagram showing a general video encoding apparatus.

A video encoding apparatus 100 may include a block splitter 110, a predictor 120, a subtractor 130, a transformer 140, a quantizer 145, an encoder 150, an inverse quantizer 160, an inverse transformer 165, an adder 170, a filter unit 180, and a memory 190. Each component of the video encoding apparatus 100 may be implemented in the form of a hardware chip or may be implemented in the form of software in such a way that one or more microprocessors perform a function of software corresponding to each component.

The block splitter 110 may split each picture configuring a video into a plurality of coding tree units (CTUs) and then may recursively split the CTU using a tree structure. A leaf node in the tree structure may be a coding unit (CU) that is a basic unit of encoding. The tree structure may be a QuadTree (QT) structure for splitting a node into four lower nodes or a QuadTree plus BinaryTree (QTBT) structure formed by mixing the QT structure and a BinaryTree (BT) structure in which a node is split into two lower nodes.

In the QuadTree plus BinaryTree (QTBT) structure, first, the CTU may be split by the QT structure. Then, lead nodes of the QT may be further split by the BT structure. Split information generated by splitting the CTU in the QTBT structure by the block splitter 110 may be encoded by the encoder 150 and may be transmitted to a decoding apparatus.

In the QT, a first flag (QT_split_flag) indicating whether to split a block of a corresponding node is encoded. When the first flag is 1, the block of the corresponding node is split into four blocks with the same size, and when the first flag is 0, the corresponding node is not further split by the QT.

In BT, a second flag (BT_split_flag) indicating whether to split a block of a corresponding node is encoded. A plurality of split types may be present in the BT. For example, there may be two types of a type of horizontally splitting a block of a corresponding node and a type of vertically splitting the block into two blocks with the same size. Alternatively, there may be an additional type of splitting the block of the corresponding node into two blocks with an asymmetric shape. The asymmetric shape may be formed by splitting a block of a corresponding node into two rectangular blocks with a size ratio of 1:3 or by splitting the block of the corresponding node in a diagonal direction. In case where the BT has a plurality of split types, if the second flag indicating that a block is split is encoded, split type information indicating the split type of the corresponding block may be additionally encoded.

Figure 2A:
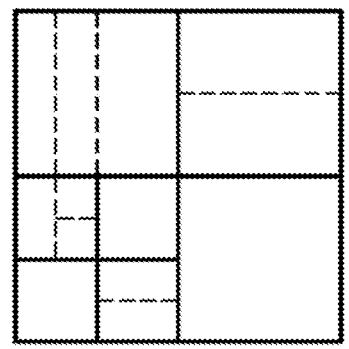
FIGS. 2A and 2B are a diagram showing an example of block split using a QuadTree plus BinaryTree (QTBT) structure.
Figure 2B:
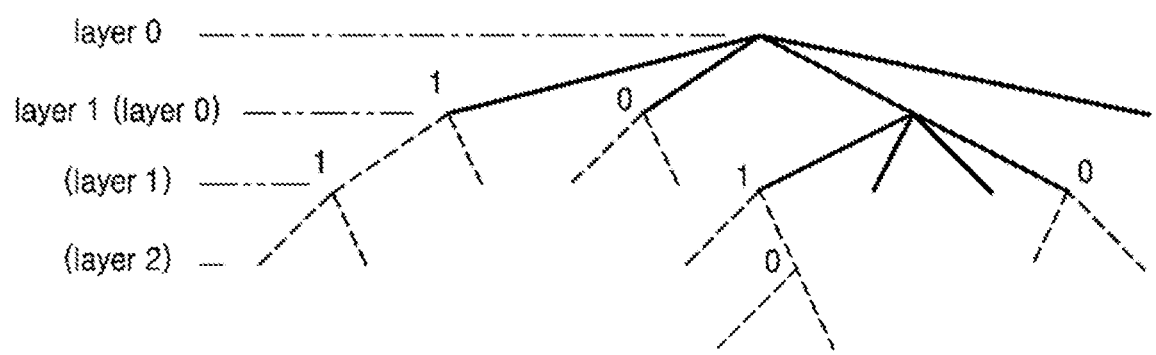

FIGS. 2A and 2B are a diagram showing an example of block split using a QTBT structure. FIG. 2A shows an example in which a block is split by the QTBT structure and FIG. 2B represents the block split in a form of a tree structure. In FIGS. 2A and 2B, a solid line represents split by the QT structure and a dotted line represents split by the BT structure. In FIG. 2B, regarding notation of layers, a layer expression without parentheses denotes a layer of QT, and a layer expression in parentheses denotes a layer of BT. The numbers in the BT structure represented by the dotted line indicate split type information.

In FIGS. 2A and 2B, the CTU, which is an uppermost layer of the QT, may be split into four nodes of layer 1. Accordingly, the block splitter 110 may generate QT_split_flag=1 indicating that the CTU is split. A block corresponding to the first node of layer 1 is not split by the QT any longer. Accordingly, the block splitter 110 generates QT_split_flag=0.

Then, a block corresponding to the first node of layer 1 of the QT may proceed to the BT. In this embodiment, it is assumed that the BT has two split types: a type of horizontally splitting the block of a node into two blocks of the same size and a type of vertically splitting the block of a node into two blocks of the same size. The first node of layer 1 of the QT becomes a root node '(layer 0)' of the BT. A block corresponding to the root node of the BT is further split into blocks of '(layer 1)', and thus, the block splitter 110 generates BT_split_flag=1 indicating that a block is split by the BT. Then, the block splitter 210 generates split type information indicating whether the corresponding block is horizontally split or vertically split. In FIGS. 2A and 2B, the block corresponding to the root node of the BT is vertically split, and thus, 1 indicating vertical split is generated as split type information. The first block among blocks of '(layer 1)' split from the root node is further split according to the vertical split type, and thus, BT_split_flag=1 and split type information 1 are generated. On the other hand, the second block of (layer 1) split from the root node of the BT is not split any longer, and thus, BT_split_flag=0 is generated.

In order to effectively signal information on block split by the QTBT structure to a decoding apparatus, the following information may be additionally encoded. The pieces of information may be encoded as header information of the video, and for example, may be encoded into a sequence parameter set (SPS) or a picture parameter set (PPS).

CTU size: Block size of the uppermost layer, i.e., the root node, of the QTBT;
MinQTSize: Minimum block size of a leaf node allowed in QT;
MaxBTSize: Maximum block size of a root node allowed in BT;
MaxBTDepth: Maximum depth allowed in BT;
MinBTSize: Minimum block size of a leaf node allowed in BT.

A block with the same size as MinQTSize in the QT is not further split, and thus split information (first flag) on the QT corresponding to the block is not encoded. In addition, a block with a larger size than MaxBTSize in the QT does not have the BT. Accordingly, split information (second flag, split type information) on the BT corresponding to the block is not encoded. When a depth of a node of the BT reaches MaxBTDepth, the block of the node is not further split, and split information (second flag, split type information) on the BT of the corresponding node is not encoded. In addition, a block with the same size as MinBTSize in the BT is not further split, and split information (second flag, split type information) on the BT is not encoded. As such, the maximum or minimum block size of a root or leaf node of the QT and the BT may be defined at a high level, such as a sequence parameter set (SPS) or a picture parameter set (PPS), and thus, an encoding amount of information indicating whether the CTU is split or information indicating a split type may be reduced.

A luma component and a chroma component of the CTU may be split using the same QTBT structure. However, the present invention is not limited thereto, and the luma component and the chroma component may be split using separate QTBT structures, respectively. For example, in the case of an intra (I) slice, the luma component and the chroma component may be split using different QTBT structures.

Hereinafter, a block corresponding to a CU to be encoded or decoded is referred to as a 'current block'.

The predictor 120 predicts a current block to generate a predicted block. The predictor 120 may include an intra predictor 122 and an inter predictor 124.

The intra predictor 122 predicts pixels in the current block using pixels (reference pixel) positioned around the current block in a current picture including the current block. There are plural intra prediction modes according to prediction directions, and the neighboring pixels to be used and the calculation equation are defined differently according to each prediction mode.

The inter predictor 124 searches for the most similar block to the current block within a reference picture that has been encoded and decoded earlier than the current picture, and generates a predicted block of the current block using the searched block. In addition, the inter predictor 124 generates a motion vector corresponding to a displacement between the current block in the current picture and the predicted block in the reference picture. Motion information including information on the reference picture used to predict the current block and information on the motion vector is encoded by the encoder 150 and transmitted to the video decoding apparatus.

Various methods may be used to minimize the number of bits required to encode the motion information.

In an example, when the reference picture and the motion vector of the current block are the same as the reference picture and the motion vector of a neighboring block, the motion information about the current block may be transmitted to the decoding apparatus by encoding information by which the neighboring block can be identified. This method is referred to as "merge mode."

In the merge mode, the inter predictor 124 may select a predetermined number of merge candidate blocks (hereinafter referred to as a 'merge candidate') from neighboring blocks of the current block.

Figure 3:
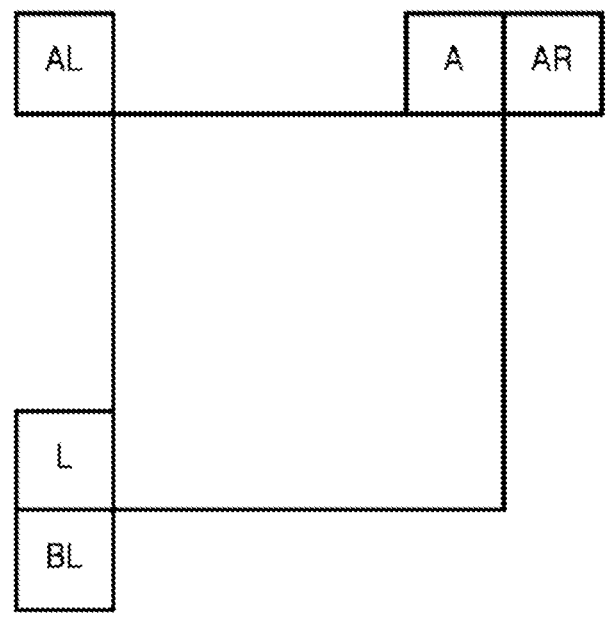
FIG. 3 is a diagram showing an example of a neighboring block of a current block.

As shown in FIG. 3, some or all of a left block L, an above block A, an above-right block AR, a bottom-left block BL, and an above-left block AL, which are adjacent to the current block in the current picture, may be used as the neighboring blocks used for deriving merge candidates. In addition, a block positioned in a reference picture (which may be the same or different from a reference picture used to predict the current block) rather than current picture in which the current block is positioned may be used as a merge candidate. For example, a co-located block of the current block in the reference picture or blocks adjacent to the co-located block may be further used as the merge candidate.

The inter predictor 124 constructs a merge list including the predetermined number of merge candidates using the neighboring blocks. A merge candidate to be used as motion information of the current block is among the merge candidates included in the merge list, and merge index information for identifying the selected candidate is generated. The generated merge index information is encoded by the encoder 150 and transmitted to the video decoding apparatus.

As another method of encoding the motion information, a motion vector difference (MVD) may be encoded.

In this method, the inter predictor 124 derives motion vector predictor (MVP) candidates for the motion vector of the current block using neighboring blocks of the current block. Some or all of the left block L, the above block A, the above-right block AR, the bottom-left block BL, and the above-left block AL, which are adjacent to the current block in the current picture shown in FIG. 3, may be used as the neighboring blocks used for deriving MVP candidates. In addition, a block positioned in a reference picture (which may be the same or different from a reference picture used to predict the current block) rather than the current picture in which the current block is positioned may be used as a neighboring block used to derive MVP candidates. For example, a co-located block of the current block in the reference picture or blocks adjacent to the co-located block may be used.

The inter predictor 124 derives MVP candidates using motion vectors of the neighboring blocks and determines a MVP of the motion vector of the current block using MVP candidates. The inter predictor calculates a motion vector difference (MVD) by subtracting the MVP from the motion vector of the current block.

The MVP may be obtained by applying a predefined function (e.g., calculation of a median or a mean) to MVP candidates. In this case, the video decoding apparatus also know the predefined function. Since the neighboring blocks used to derive the MVP candidates are blocks that have been already encoded and decoded, the video decoding apparatus already knows the motion vectors of the neighboring blocks. Accordingly, the video encoding apparatus 100 does not need to encode information for identifying the MVP candidates. Accordingly, in this case, information on the MVD and information on the reference picture used to predict the current block are encoded.

In another embodiment, the MVP may be determined by selecting any one of MVP candidates. In this case, information for identifying the selected MVP candidate is additionally encoded together with the information on the MVD and the information on the reference picture used to predict the current block.

The subtractor 130 subtract the predicted block generated by the intra predictor 122 or the inter predictor 124 from the current block to generate a residual block.

The transformer 140 transforms residual signals in the residual block, which are values in a spatial domain, into transform coefficients in the frequency domain. The transformer 140 may transform residual signals in the residual block using a size of the current block as a transform unit or may split the residual block into a plurality of smaller subblocks and transform residual signals in transform units corresponding to the sizes of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 145 quantizes the transform coefficients output from the transformer 140 and outputs the quantized transform coefficients to the encoder 150.

The encoder 150 encodes the quantized transform coefficients using a coding scheme such as CABAC to generate abitstream. The encoder 150 may encode information such as CTU size, MinQTSize, MaxBTSize, MaxBTDepth, MinBTSize, QT_split_flag, BT_split_flag, and split type, which are related to block split, and the decoding apparatus may split a block in the same way as the encoding apparatus.

The encoder 150 encodes information on a prediction type indicating whether a current block is encoded via intra-prediction or inter prediction and encodes intra-prediction information or inter prediction information according to the prediction type.

When the current block is inter-predicted, the encoder 150 encodes a syntax element of the inter prediction information. The syntax element of the inter prediction information may include the following information.

(1) mode information indicating whether motion information of the current block is encoded in a merge mode or is encoded in a mode in which a MVD is encoded (2) syntax element of motion information When the motion information is encoded by the merge mode, the encoder 150 encodes merge index information indicating which candidate is selected as a candidate for extracting motion information of the current block among merge candidates, as the syntax element of the motion information.

On the other hand, when the motion information is encoded by the mode in which the MVD is encoded, information on the MVD and information on the reference picture are encoded as the syntax element of the motion information. When a MVP is determined using a method of selecting any one candidate from a plurality of MVP candidates, the syntax element of the motion information may further include MVP identification information for identification of the selected candidate.

The inverse quantizer 160 inversely quantizes the quantized transform coefficients output from the quantizer 145 to generate transform coefficients. The inverse transformer 165 transforms the transform coefficients output from the inverse quantizer 160 to the spatial domain from the frequency domain, and therefore reconstructs the residual block.

The adder 170 adds the reconstructed residual block and the predicted block generated by the predictor 120 to reconstruct the current block. Pixels in the restored current block may be used as a reference pixel when a block with a subsequent sequence is intra-predicted.

The filter unit 180 deblock-filters boundaries between the reconstructed blocks in order to remove blocking artifacts generated due to encoding/decoding in units of blocks and stores the deblock-filtered blocks in the memory 190. When all blocks in one picture are restored, the restored picture may be used as a reference picture for inter prediction of a block in a picture to be subsequently encoded.

For reference, the video encoding apparatus may encode the current block using a skip mode. In the skip mode, only the motion information of the current block is encoded, and any other information on the current block, such as information on a residual block, is not encoded. The aforementioned merge index information may be used as the motion information of the current block. When the current block has been encoded in the skip mode, the video decoding apparatus sets the motion information of the merge candidate indicated by the merge index information decoded from the bitstream, as the motion information of the current block. In the skip mode, the predicted block predicted based on the motion information of the current block is reconstructed as the current block.

The skip mode may be different from the merge mode for encoding information on the residual block as well as the motion information of the current block in that no other information except for the motion information of the current block is encoded in the skip mode. However, methods for encoding the motion information of the current block in the skip mode and the merge mode are the same, and thus, all of the following descriptions of the merge mode may be applied to the skip mode in the same way.

Figure 4:
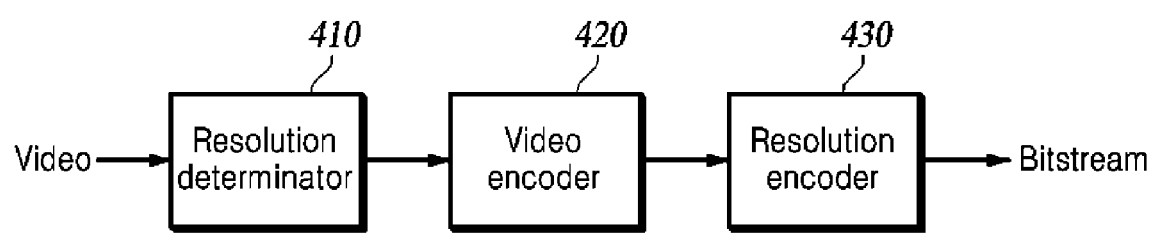
FIG. 4 is a diagram showing a video encoding apparatus according to an embodiment of the present invention.

FIG. 4 is a diagram showing a video encoding apparatus 400 according to an embodiment of the present invention.

The video encoding apparatus 400 according to an embodiment of the present invention may include a resolution determinator 410, a video encoder 420, and a resolution encoder 430.

The resolution determinator 410 determines motion vector resolution for motion estimation of the current CU. The motion vector resolution may be a minimum unit for representing a motion vector. The motion vector resolution may indicate resolution for compensating for motion of the current CU in a reference picture, and that is, may indicate a pixel up to which a reference picture is interpolated. For example, when the motion vector resolution is ¼ pixel, the reference picture may be interpolated up to positions of ¼ pixel and the motion vector may be measured up to units of ¼ pixel. Here, a minimum unit for determining the motion vector may be a fractional pixel such as ¼ pixel or ½ pixel or may be an integer pixel unit such as 1 pixel, 2 pixels, 3 pixels, or 4 pixels.

The video encoder 420 estimates motion in units of blocks (i.e., in units of CUs) according to the determined motion vector resolution to determine the motion vector of the CU, and predicts and encodes the CU using the determined motion vector.

The resolution encoder 430 encodes information on the motion vector resolution of the motion vector used to predict the CU.

Here, the video encoder 420 may be embodied as the video encoding apparatus 100 described above with reference to FIG. 1.

A function of the resolution determinator 410 may be included in the aforementioned function of the prediction unit 120 in the video encoding apparatus 100 and may be integrated into the predictor 120.

A function of the resolution encoder 430 may be included in the aforementioned function of the encoder 150 of the video encoding apparatus 100 and may be integrated into the encoder 150.

Figure 5:
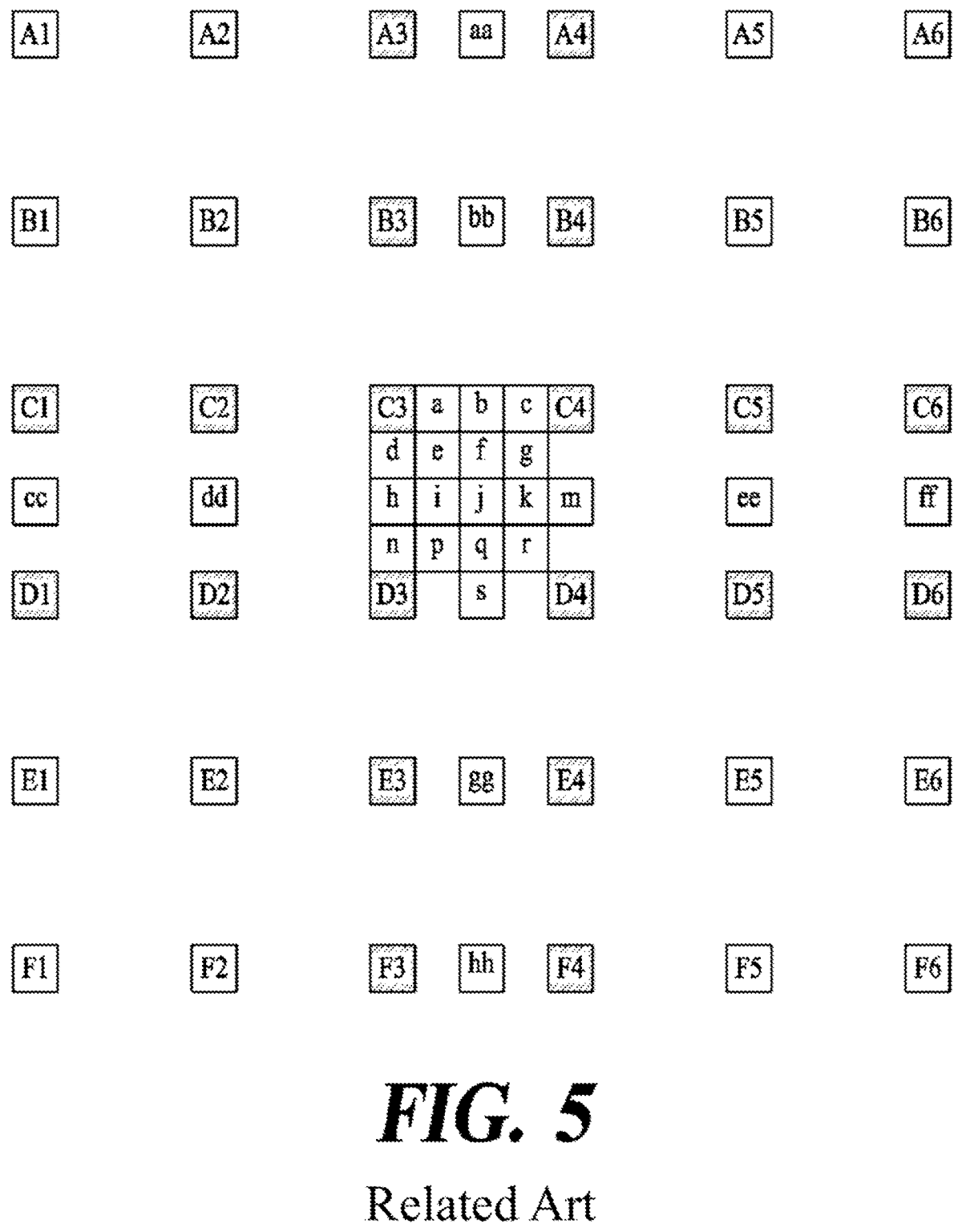

FIG. 5 is a diagram illustrating interpolation and motion compensation procedure, which is performed by the inter predictor 124, and resolution of a motion vector.

FIG. 5 illustrates pixels of a reference picture stored in the memory 190 and sub-pixels formed by interpolating the integer pixels of the reference picture. As shown in FIG. 5, when integer pixels A1 to F6 of the reference picture are filtered by an interpolation filter, for example, sub pixels 'a' to 's' may be generated, and when such interpolation is performed, resolution of motion estimation and motion compensation may be increased by 2 times, 4 times, or more compared with integer pixel resolution.

The motion estimation is a procedure of searching for the most similar portion to a current CU from an interpolated reference picture and outputting a block of the corresponding portion and a motion vector indicating the corresponding block. The motion vector generated in this procedure is encoded by the encoder 150.

During motion estimation and motion compensation, when an image region with a fine motion is predicted, the motion vector may be represented in units of fractional pixels (½-pixel, ¼-pixel, ⅛-pixel, or ⅙-pixel), and when an image region with a large motion is predicted, the motion vector may be represented in units of one or more integer pixels (units of 1-pixel, 2-pixel, 3-pixel, or 4-pixel).

Figure 6A:
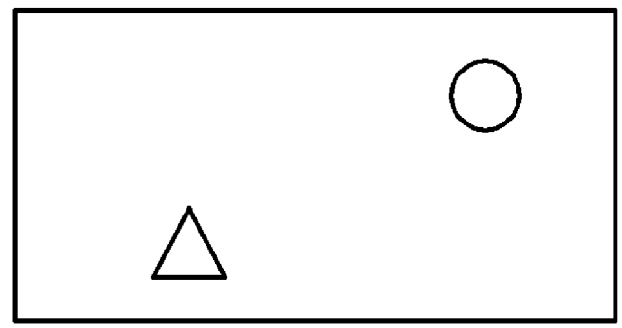
FIGS. 6A and 6B are a diagram for comparison of a motion degree between two frames.
Figure 6B:
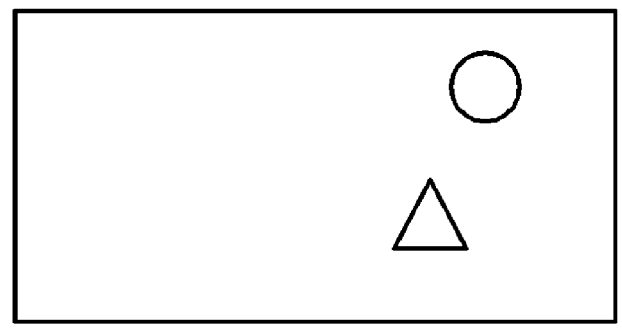

FIGS. 6A and 6B are a diagram for comparison of a motion degree between two frames.

In FIGS. 6A and 6B, when a reference frame and a current frame are compared in terms of motion of an object included therein, an object corresponding to a circle in FIGS. 6A and 6B has fine motion between the two frames, and thus, motion of the corresponding object may be estimated in units of fractional pixels, and because an object corresponding to a triangle has relatively large motion between the two frames, the motion may be estimated in units of integer pixels.

When the inter prediction mode of the CU that is an encoding target is a merge mode, motion information is not directly signaled, but instead, an index value corresponding to a motion information candidate selected from the plurality of motion information candidates is signaled. Accordingly, information on motion vector resolution of the selected motion information candidate is not transmitted.

On the other hand, when the inter prediction mode of the CU is a mode in which a MVD is encoded, the MVD information is signaled, and thus, it may be more effective to represent MVD information either in unit of fractional pixel or in unit of integer pixel depending on the resolution of the MVD.

Figure 7:
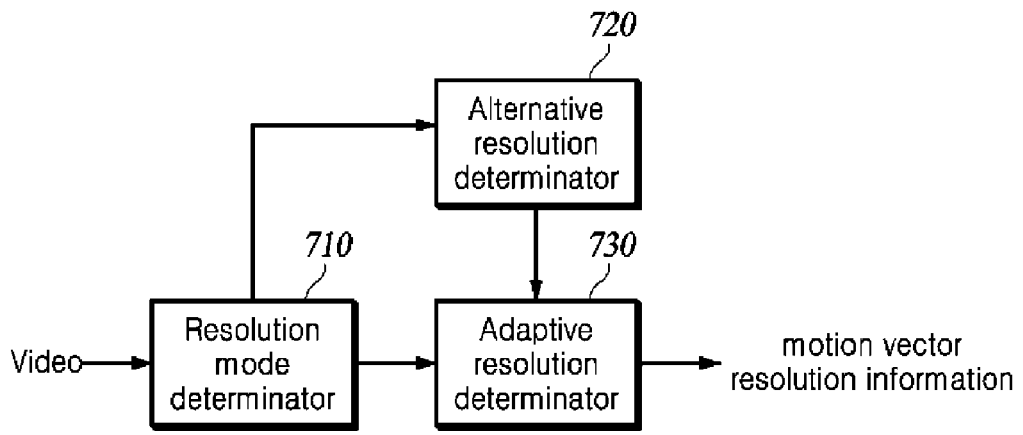
FIG. 7 is a diagram showing an example of the resolution determinator 410 according to an embodiment.

FIG. 7 is a diagram showing an example of the resolution determinator 410 according to an embodiment.

The resolution determinator 410 may include a resolution mode determinator 710, an alternative resolution determinator 720, and an adaptive resolution determinator 730. In some embodiments, the resolution determinator 410 may be embodied in a form in which at least one component of the resolution mode determinator 710, the alternative resolution determinator 720, and the adaptive resolution determinator 730 is omitted.

The resolution mode determinator 710 determines whether an adaptive motion vector resolution mode is activated. For example, whether motion vector resolution is adaptively enabled may be selected with respect to a higher level image unit included in a plurality of CUs. Here, the higher level image unit may be an image sequence, a picture, a slice, a CTU, or the like. When the motion vector resolution of the higher level image unit is not adaptively enabled (i.e., when a corresponding mode is not an adaptive motion vector resolution mode), default motion vector resolution is applied to all CUs in the higher level image unit. That is, fixed default motion vector resolution such as ¼ pixel may be applied to all CUs in the higher level image unit. Here, the default motion vector resolution may be predetermined specific motion vector resolution shared by the video encoding apparatus and the video decoding apparatus or may be a value that is determined in a higher level image region by the video encoding apparatus and is signaled to the video decoding apparatus. On the other hand, when the adaptive motion vector resolution mode is enabled to be applied, the alternative resolution determinator 720 and the adaptive resolution determinator 730 that will be described below adaptively determine motion vector resolution for each CU to be inter-predicted.

When the adaptive motion vector resolution mode is enabled to be applied, the alternative resolution determinator 720 determines alternative resolution other than default motion vector resolution. The alternative resolution may be applied for each unit of any one of a sequence, a picture, a slice, a CTU, and a CU. The alternative resolution may be determined for each of the same image unit as an image unit to which the adaptive motion vector resolution mode is applied. For example, when the adaptive motion vector resolution mode is applied in units of SPSs, the alternative resolution may also be determined in units of SPSs, and when the adaptive motion vector resolution mode is applied in a PPS or slice unit, the alternative resolution may also be determined in a PPS or slice unit. Alternatively, the alternative resolution may be determined for each smaller image unit (e.g., a slice, a CTU, or a CU) than the image unit to which the adaptive motion vector resolution mode is applied. For example, when the adaptive motion vector resolution mode is applied in units of SPSs, the alternative resolution may be determined in units of any one of a PPS, a slice, and a CTU, which are an image unit of a lower level than the SPS, and when the adaptive motion vector resolution mode is applied in units of PPSs, the alternative resolution may be determined in units of any one of a slice and a CTU, which are an image unit of a lower level than the PPS. Alternatively, the alternative resolution may be determined in units of CUs to be encoded.

The alternative resolution determinator 720 may select one among a plurality of motion vector resolution candidates as alternative resolution.

The adaptive resolution determinator 730 may determine motion vector resolution of the current CU. For example, the adaptive resolution determinator 730 may determine any one of default motion vector resolution and alternative resolution as motion vector resolution of the current CU.

The resolution encoder 430 may generate and encode information on the motion vector resolution based on information determined by the resolution determinator 410. Hereinafter, methods that the resolution encoder 430 encodes motion vector resolution information are exemplified with regard to first to second embodiments, in a case where motion vector resolution of the current CU is determined among default motion vector resolution and alternative resolution(s).

First Embodiment

In the first embodiment, an image unit for selecting whether motion vector resolution is adaptively determined between default motion vector resolution and alternative resolution is identical to an image unit for determining alternative resolution are the same, and the two image units are each larger than a CU.

When whether motion vector resolution is adaptively enabled is selected for each image sequence unit by the resolution mode determinator 710, the resolution encoder 430 may insert Adaptive_MV_resolution_enabled_flag (i.e., first identification information), which is a flag indicating whether motion vector resolution is adaptively enabled, into a sequence parameter set (SPS).

When whether motion vector resolution is adaptively enabled is selected for each picture unit by the resolution mode determinator 710, the resolution encoder 430 may insert Adaptive_MV_resolution_enabled_flag, which is a flag indicating whether motion vector resolution is adaptively enabled, into a picture parameter set (PPS).

When whether motion vector resolution is adaptively enabled is selected for each slice (or CTU) unit by the resolution mode determinator 710, the resolution encoder 430 may insert Adaptive_MV_resolution_enabled_flag, which is a flag indicating whether motion vector resolution is adaptively enabled, into a slice (or CTU) header.

When the resolution mode determinator 710 selects the adaptive motion vector resolution mode where motion vector resolution is adaptively enabled, Adaptive_MV_resolution_enabled_flag=ON (e.g., ON=1) may be set. Otherwise, Adaptive_MV_resolution_enabled_flag=OFF (e.g., in the case of ON=1, OFF=0) may be set.

According to the first embodiment, a unit of determining alternative resolution at the alternative resolution determinator 720 is the same as a unit of setting Adaptive_MV_resolution_enabled_flag. In the case of Adaptive_MV_resolution_enabled_flag=ON, the alternative resolution determinator 720 determines alternative resolution, and the resolution encoder 430 generates alternative_mv_resolution information indicating the determined alternative resolution. The resolution encoder 430 encodes alternative_mv_resolution information that is generated for each of the same unit as the unit for setting Adaptive_MV_resolution_enabled_flag.

When one of a plurality of predefined motion vector resolution candidates is selected as alternative resolution, the resolution encoder 430 may generate and encode, as alternative_mv_resolution information, information for identification of alternative resolution that is selected from the plurality of predefined motion vector resolution candidates.

When the adaptive resolution determinator 730 determines default motion vector resolution to be used as motion vector resolution of the current CU, the resolution encoder 430 may generate mv_resolution_flag (i.e., second identification information) indicating that default motion vector resolution is used as motion vector resolution of the current CU.

When the adaptive resolution determinator 730 determines alternative resolution, which is not default motion vector resolution, to be used as motion vector resolution of the current CU, the resolution encoder 430 may generate and encode mv_resolution_flag indicating that alternative resolution is used as motion vector resolution of the current CU.

Second Embodiment

In the second embodiment, an image unit for selecting whether motion vector resolution is adaptively determined between default motion vector resolution and alternative resolution is a higher level image unit than an image unit for determining alternative resolution, and the image unit for determining alternative resolution is a higher level image unit than a CU.

The first embodiment is an embodiment in which an image unit for selecting whether motion vector resolution is adaptively determined between default motion vector resolution and alternative resolution and an image unit for determining alternative resolution are the same and the two image units are each larger than a CU.

When whether motion vector resolution is adaptively enabled is selected for each image sequence unit by the resolution mode determinator 710, the resolution encoder 430 may insert Adaptive_MV_resolution_enabled_flag, which is a flag indicating whether motion vector resolution is adaptively enabled, into an SPS.

When whether motion vector resolution is adaptively enabled is selected for each picture unit by the resolution mode determinator 710, the resolution encoder 430 may insert Adaptive_MV_resolution_enabled_flag, which is a flag indicating whether motion vector resolution is adaptively enabled, into a PPS.

Here, when the resolution mode determinator 710 selects the adaptive motion vector resolution mode where motion vector resolution is adaptively enabled, Adaptive_MV_resolution_enabled_flag=ON may be set. Otherwise, Adaptive_MV_resolution_enabled_flag=OFF may be set.

A unit of determining alternative resolution at the alternative resolution determinator 720 may be determined as an image unit (e.g., a slice or a CTU) that is smaller than an image unit of setting Adaptive_MV_resolution_enabled_flag and is larger than a CU. In this case, the resolution encoder 430 may generate and encode alternative_mv_resolution information indicating alternative resolution for each slice or CTU.

When one of a plurality of predefined motion vector resolution candidates is selected as alternative resolution, the resolution encoder 430 may generate and encode, as alternative_mv_resolution information, information for identification of alternative resolution that is selected from the plurality of predefined motion vector resolution candidates.

When a value of alternative_mv_resolution information indicates 0, motion vector resolution of all CUs in the corresponding slice or CTU is not adaptively enabled.

When motion vector resolution is adaptively enabled, the resolution encoder 430 may generate Alternative_enabled_flag information, which is a flag indicating whether alternative resolution is used, for each slice or CTU and may encode the Alternative_enabled_flaginformation.

Here, when alternative resolution is used, alternative_mv_resolution information indicating alternative resolution may be generated and encoded for each slice or CTU.

When the adaptive resolution determinator 730 determines to use default motion vector resolution as motion vector resolution of the current CU, the resolution encoder 430 may generate and encode mv_resolution_flag indicating that the default motion vector resolution is used as motion vector resolution of the current CU.

When the adaptive resolution determinator 730 determines to use alternative resolution that is not default motion vector resolution, as motion vector resolution of the current CU, the resolution encoder 430 may generate mv_resolution_flag indicating that alternative resolution is used as motion vector resolution of the current CU and may encode information on the mv_resolution_flag.

Third Embodiment

In the third embodiment, an image unit for adaptively determining motion vector resolution between default motion vector resolution and alternative resolution is a higher level image unit of an image unit for determining alternative resolution and the image unit for determining alternative resolution is a CU unit.

When whether motion vector resolution is adaptively enabled is selected for each image sequence unit, each picture unit, each slice unit, or each CTU unit by the resolution mode determinator 710, the resolution encoder 430 may insert Adaptive_MV_resolution_enabled_flag, which is a flag indicating whether motion vector resolution is adaptively enabled, into an SPS, a PPS, a slice header, or a CTU header.

Like in the first and second embodiments, according to the selection result of whether motion vector resolution is adaptively enabled, Adaptive_MV_resolution_enabled_flag may be set to ON or OFF.

When the resolution mode determinator 710 selects the adaptive motion vector resolution mode where motion vector resolution is adaptively enabled, if default motion vector resolution is selected as motion vector resolution of the current CU, the resolution encoder 430 may generate and encode mv_resolution_flag indicating that default motion vector resolution is used as motion vector resolution of the current CU.

According to the third embodiment, a unit for determining alternative resolution by the alternative resolution determinator 720 may be a CU unit that is the same as a unit for determining motion vector resolution.

When alternative resolution that is not default motion vector resolution is used as motion vector resolution of the current CU, the resolution encoder 430 may generate mv_resolution_flag indicating that alternative resolution is used as motion vector resolution of the current CU, may generate alternative_mv_resolution information on alternative resolution determined by the alternative resolution determinator 720, and may encode information on mv_resolution_flag and alternative_mv_resolution.

When one of a plurality of predefined motion vector resolution candidates is selected as alternative resolution, the resolution encoder 430 may encode, as alternative_mv_resolution information, information for identifying the alternative resolution selected from the plurality of predefined motion vector resolution candidates.

The adaptive resolution determinator 730 may select any one of a plurality of motion vector resolution candidates as motion vector resolution of the current CU, instead of selecting any one of default motion vector resolution and alternative resolution as motion vector resolution of the current CU. In this case, in order to effectively encode the determined motion vector resolution information of the current CU, the resolution encoder 430 may encode the motion vector resolution information of the current CU as a differential value between motion vector resolution of the current CU and alternative resolution or a differential value between the motion vector resolution of the current CU and motion vector resolution of a previous CU rather than encoding the motion vector resolution itself of the current CU.

Figure 8:
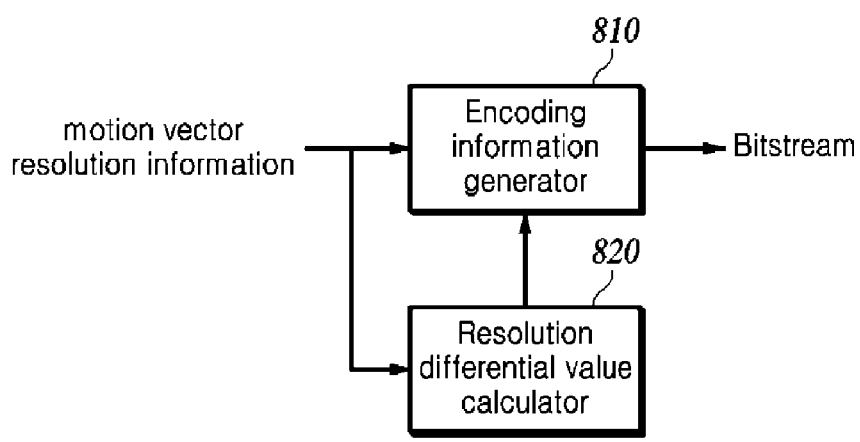
FIG. 8 is a diagram showing an example of the resolution encoder 430 when motion vector resolution information of a current CU is encoded as a resolution differential value.

FIG. 8 is a diagram showing an example of the resolution encoder 430 when motion vector resolution information of a current CU is encoded as a resolution differential value.

As shown in FIG. 8, the resolution encoder 430 may include an encoding information generator 810 and a resolution differential value calculator 820. A detailed operation will be described below with regard to a fourth embodiment.

Fourth Embodiment

When the resolution mode determinator 710 adaptively enables motion vector resolution in units of sequences, pictures, slices, or CTU, the encoding information generator 810 may set Adaptive_MV_resolution_enabled_flag to ON for each sequence, each picture, each slice unit, or each CTU unit, which is a higher image unit.

The encoding information generator 810 may check whether default motion vector resolution is used as motion vector resolution of a corresponding CU, for each CU in the higher image unit. When default motion vector resolution is used as motion vector resolution of a current CU, the encoding information generator 810 may set mv_resolution_flag corresponding to the current CU to OFF. When default motion vector resolution is not used as motion vector resolution of the current CU and any one selected from a plurality of motion vector resolution candidates is used as motion vector resolution of the current CU, the encoding information generator 810 may set mv_resolution_flag corresponding to the current CU to ON.

When the alternative resolution determinator 720 determines an alternative resolution value for each of the same image unit as a unit for setting Adaptive_MV_resolution_enabled_flag, the encoding information generator 810 may encode the determined alternative resolution as alternative_mv_resolution information for each of the same image unit as the unit for setting Adaptive_MV_resolution_enabled_flag.

As described above, a unit for determining the alternative resolution is not limited to being determined for each of the same image unit as a unit for setting Adaptive_MV_resolution_enabled_flag, but instead may be determined for each CU unit or may be determined for each image unit that is smaller than a unit for setting Adaptive_MV_resolution_enabled_flag and is larger than a CU unit, but the description thereof has been given above, and thus, a detailed description thereof is omitted.

When any one selected from a plurality of motion vector resolution candidates is used as motion vector resolution of the current CU, the resolution differential value calculator 820 may calculate a resolution differential value that is a differential value between the motion vector resolution of the current CU and a motion vector resolution of a previous CU (e.g., a value obtained by subtracting the motion vector resolution of the previous CU from the motion vector resolution of the current CU), as an element included in information on the motion vector resolution of the current CU.

However, when the current CU is the first CU in an encoding order among CUs in the higher level image unit, the resolution differential value calculator 820 may determine the motion vector resolution of the current CU as resolution differential value information or may determine an alternative resolution determined by the alternative resolution determinator 720 as resolution differential value information.

When any one selected from a plurality of motion vector resolution candidates is used as motion vector resolution of the current CU, the resolution differential value calculator 820 may calculate a resolution differential value that is a differential value between the motion vector resolution of the current CU and the alternative_mv_resolution (e.g., a value obtained by subtracting an alternative_mv_resolution from the motion vector resolution of the current CU), as element included in information on the motion vector resolution of the current CU.

The resolution differential value information determined by the resolution differential value calculator 820 may be stored as mv_resolution_delta.

When the motion vector resolution of the current CU is described as an mv_resolution_delta value, the alternative resolution needs not be generated, and thus, an operation of the alternative resolution determinator 720 may be omitted.

The encoding information generator 810 may generate and encode information on motion vector resolution of the current CU based on the result of the resolution mode determinator 710 and the adaptive resolution determinator 730. The encoding information generator 810 may encode Adaptive_MV_resolution_enabled_flag to ON or OFF according to whether the resolution mode determinator 710 adaptively enabled motion vector resolutions of CUs included in the higher level image unit.

When Adaptive_MV_resolution_enabled_flag is ON, the adaptive resolution determinator 730 selects whether default motion vector resolution is used as motion vector resolution of the current CU or any one selected from a plurality of motion vector resolution candidates is determined as motion vector resolution of the current CU. The encoding information generator 810 encodes mv_resolution_flag according to the selection. The encoding information generator 810 does not encode mv_resolution_flag when Adaptive_MV_resolution_enabled_flag is OFF.

When mv_resolution_flag is ON (i.e., when any one selected from a plurality of motion vector resolution candidates is used as motion vector resolution of the current CU), the encoding information generator 810 may encode mv_resolution_delta, which is information on the resolution differential value calculated by the resolution differential value calculator 820. When mv_resolution_flag is OFF (i.e., when default motion vector resolution is used as motion vector resolution of the current CU), the encoding information generator 810 may not encode mv_resolution_delta.

The resolution encoder 430 may represent the resolution differential value as a resolution scale factor via a division operation instead of a value via a subtraction operation '−'. Furthermore, the scale factor may be represented on a log scale, and a detailed operation thereof will be described with regard to a fifth embodiment.

Fifth Embodiment

Figure 9:
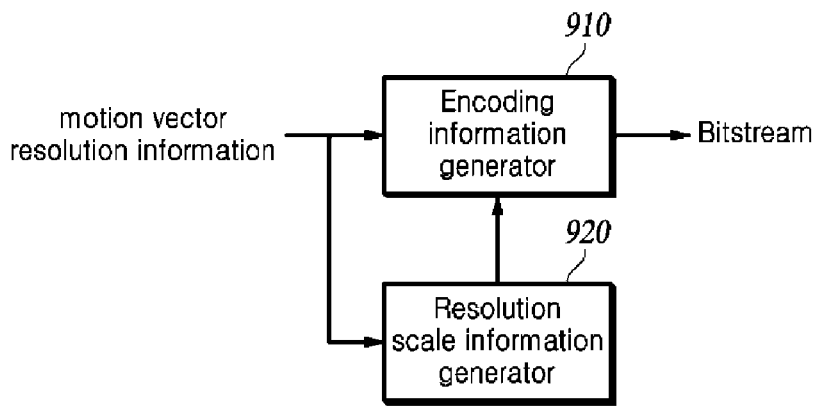
FIG. 9 is a diagram showing an example of the resolution encoder 430 that represents a motion vector of a current CU as a resolution scale factor instead of a resolution differential value.

FIG. 9 is a diagram showing an example of the resolution encoder 430 that represents motion vector resolution of the current CU as a resolution scale factor instead of a resolution differential value.

As shown in FIG. 9, the resolution encoder 430 may include an encoding information generator 910 and a resolution scale information generator 920. The resolution scale information generator 920 of FIG. 9 may replace the resolution differential value calculator 820 of FIG. 8, and the encoding information generator 910 of FIG. 9 may replace the encoding information generator 810 of FIG. 8.

The resolution differential value calculator 820 and the resolution scale information generator 920 are different from each other in that the resolution differential value calculator 820 calculates a resolution differential value and generates mv_resolution_delta as information on the resolution differential value, while the resolution scale information generator 920 calculates a resolution scale factor and generates mv_resolution_scale as information on the resolution scale factor.

For example, the resolution scale information generator 920 may calculate a ratio between the motion vector resolution of the current CU and a motion vector resolution of a previous CU (e.g., a value obtained by dividing the motion vector resolution of the current CU by the motion vector resolution of the previous CU), as an element included in information on the motion vector resolution of the current CU.

However, when the current CU is the first CU in an encoding order among CUs in the higher level image unit, the resolution scale information generator 920 may determine the motion vector resolution of the current CU as resolution scale factor information or may determine an alternative resolution determined by the alternative resolution determinator 720 as resolution scale factor information.

The resolution scale information generator 920 may calculate a resolution scale factor that is a ratio between the motion vector resolution of the current CU and the alternative_mv_resolution (i.e., a value obtained by dividing the motion vector resolution of the current CU by the alternative_mv_resolution), as an element included in information on the motion vector resolution of the current CU.

The resolution scale factor information determined by the resolution scale information generator 920 may be stored as mv_resolution_scale.

Except that the encoding information generator 810 of FIG. 8 encodes mv_resolution_delta, but instead the encoding information generator 910 of FIG. 9 encodes information (mv_resolution_scale) on the resolution scale factor, the remaining operations of the encoding information generator 810 of FIG. 8 and the remaining operations of the encoding information generator 910 of FIG. 9 may be the same. The encoding information generator 910 encodes information (mv_resolution_scale) on the resolution scale factor. Except encoding mv_resolution_scale instead of mv_resolution_delta, operations of the encoding information generator 910 may be the same as that of the encoding information generator 810 of FIG. 8

In the above embodiments of an video encoding apparatus, a unit of a block for determining motion vector resolution is described as a CU, but is not limited thereto, and in some embodiments, may be a CTU. When the unit of the block for determining the motion vector resolution is a CTU, all CUs included in the CTU may have the same motion vector resolution value. In addition, all CUs which are encoded by an mvp mode among CUs included in the corresponding CTU may have the same motion vector resolution value as motion vector resolution of the corresponding CTU.

Hereinafter, a video decoding apparatus will be described.

Figure 10:
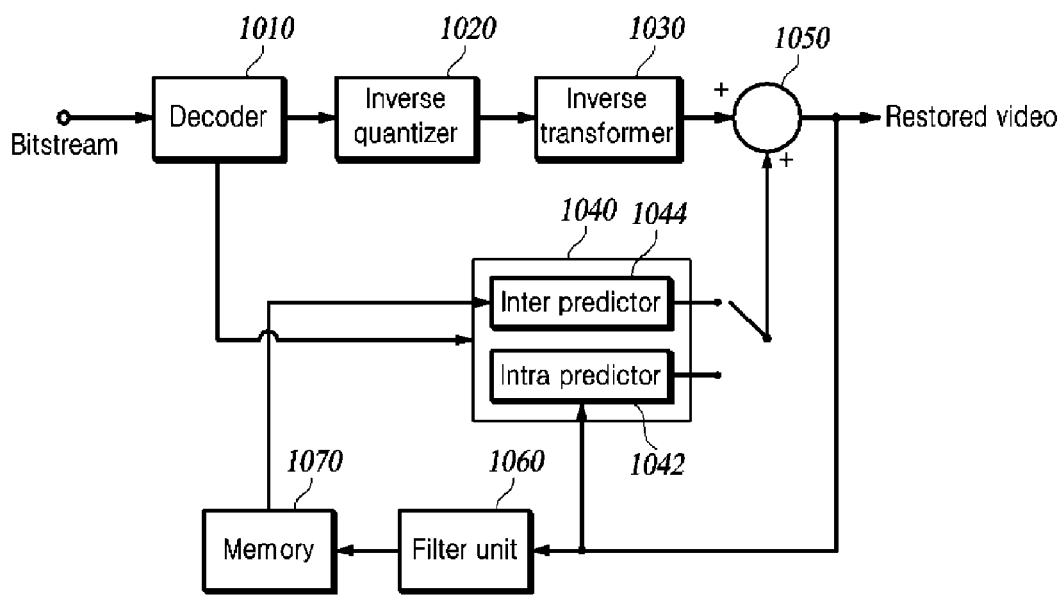
FIG. 10 is a schematic diagram of a general video decoding apparatus.

FIG. 10 is a schematic diagram of a general video decoding apparatus.

A video decoding apparatus 1000 may include a decoder 1010, an inverse quantizer 1020, an inverse transformer 1030, a predictor 1040, an adder 1050, a filter unit 1060, and a memory 1070. Like in the video encoding apparatus of FIG. 1, each component of the video decoding apparatus may be implemented in the form of a hardware chip or may be implemented in the form of software in such a way that a microprocessor performs a function of software corresponding to each component.

The decoder 1010 decodes a bitstream received from an video encoding apparatus, and thereby extracts information related to block split to determine a current block to be decoded and extract prediction information, information on a residual block, and the like, which is required to reconstruct the current block.

The decoder 1010 may extract information on the size of a CTU from a sequence parameter set (SPS) or a picture parameter set (PPS) to determine the size of the CTU, and may split a picture into the CTU with the determined size. In addition, the decoder 1010 may set the CTU as the uppermost layer of the tree structure, i.e., a root node and may extract split information of the CTU to split the CTU using the tree structure. For example, when the CTU is split using the QTBT structure, a first flag (QT_split_flag) related to split of the QT may be extracted and, then, each node may be split into four nodes of a lower layer. In addition, with regard to a node corresponding to a leaf node of the QT, a second flag (BT_split_flag) related to split of the BT and split type information may be extracted and the corresponding leaf node may be split in the BT structure.

As an example of the block split structure of FIGS. 2A and 2B, QT_split_flag corresponding to anode of the uppermost layer of the QTBT structure is extracted. A value of the extracted QT_split_flag is 1, and thus, a node of the uppermost layer is split into four nodes of a lower layer (layer 1 of QT). In addition, QT_split_flag of the first node of layer 1 is extracted. A value of the extracted QT_split_flag is 0, and thus, the first node of layer 1 is not split into the QT structure any longer.

Since the first node of layer 1 of QT is a leaf node of QT, the operation precedes to a BT which takes the first node of layer 1 of QT as a root node of the BT. BT_split_flag corresponding to the root node of the BT, that is, '(layer 0)', is extracted. Since BT_split_flag is 1, the root node of the BT is split into two nodes of '(layer 1)'. Since the root node of BT is split, split type information indicating whether the block corresponding to the root node of BT is vertically split or horizontally split is extracted. Since the split type information is 1, the block corresponding to the root node of BT is vertically split. Then, the decoder 1010 extracts BT_split_ flag for the first node of '(layer 1)' which is split from the root node of the BT. Since BT_split_flag is 1, the split type information about the block of the first node of '(layer 1)' is extracted. Since the split type information about the block of the first node of '(layer 1)' is 1, the block of the first node of '(layer 1)' is vertically split. Then, BT_split_flag of the second node of '(layer 1)' split from the root node of the BT is extracted. Since BT_split_flag is 0, the node is not further split by the BT.

In this way, the decoder 1010 recursively extracts QT_split_flag and splits the CTU in the QT structure. The decoder extracts BT_split_flag for a leaf node of the QT. When BT_split_flag indicates splitting, the split type information is extracted. In this way, the decoder 1510 may identify that the CTU is split into a structure as shown in FIG. 2A.

When information such as MinQTSize, MaxBTSize, MaxBTDepth, or MinBTSize is additionally defined in an SPS or a PPS, the decoder 1010 may extract the additional information, and may use the additional information in extracting split information about the QT and the BT.

For example, a block with the same size as MinQTSize in the QT is not further split. Accordingly, the decoder 1010 does not extract split information (QT_split_flag) related to the QT of the corresponding block from a bitstream (that is, QT_split_flag of the corresponding block is not present in the bitstream) and automatically sets this value to 0. In addition, in the QT, a block having a size larger than MaxBTSize does not have a BT. Accordingly, the decoder 1510 does not extract the BT split flag for a leaf node having a block larger than MaxBTSize in the QT, and automatically sets the BT split flag to 0. Further, when the depth of a corresponding node of BT reaches MaxBTDepth, the block of the node is not further split. Accordingly, the BT split flag of the node is not extracted from the bit stream, and the value thereof is automatically set to 0. In addition, a block having the same size as MinBTSize in the BT is not further split. Accordingly, the decoder 1510 does not extract the BT split flag of the block having the same size as MinBTSize from the bitstream, and automatically sets the value of the flag to 0.

Upon determining a current block to be decoded through splitting of a tree structure, the decoder 1010 extracts information on a prediction type indicating whether the current block is intra-predicted or inter-predicted.

When the prediction type information indicates inter prediction, the decoder 1010 may extract a syntax element for inter prediction information. First, mode information indicating a mode in which the motion information about the current block is encoded among a plurality of encoding modes is extracted. Here, the plurality of encoding modes may include a merge mode and a motion vector difference (MVD) encoding mode. When the mode information indicates the merge mode, the decoder 1010 extracts merge index information indicating a candidate from which the motion vector of the current block is derived among merge candidates, as a syntax element for motion information. On the other hand, when mode information indicates the MVD encoding mode, the decoder 1010 extracts information on the MVD and information on a reference picture referred to by the motion of the current block, as a syntax element for the motion vector. When the video encoding apparatus uses any one of a plurality of motion vector predictor (MVP) candidates as a MVP of a current block, MVP identification information may be included in a bitstream. Accordingly, in this case, MVP identification information as well as information on the MVD and information on the reference picture are extracted as a syntax element of the motion vector.

The decoder 1010 extracts information on quantized transform coefficients of the current block as information on residual signals.

The inverse quantizer 1020 inversely quantizes the quantized transform coefficients, and the inverse transformer 1030 inversely transforms the inversely quantized transform coefficients to a space domain from the frequency domain to reconstruct residual signals, and thereby generates a residual block of the current block.

The predictor 1040 may include an intra predictor 1042 and an inter predictor 1044. The intra predictor 1042 is activated in the case that the prediction type of the current block is intra prediction, and the inter predictor 1044 is activated in the case that the prediction type of the current block is inter prediction.

The intra predictor 1042 determines an intra-prediction mode of the current block among a plurality of intra-prediction modes, from the syntax element of the intra-prediction mode extracted from the decoder 1010, and predicts the current block using neighboring reference pixels of the current block according to the intra-prediction mode.

The inter predictor 1044 determines motion information of the current block using the syntax element for the inter prediction information extracted from the decoder 1010, and predicts the current block using the determined motion information.

First, the inter predictor 1044 may check mode information of the inter prediction extracted from the decoder 1010. When the mode information indicates a merge mode, the inter predictor 1044 constructs a merge list including a predetermined number of merge candidates using a neighboring block of the current block. A method of configuring the merge list by the inter predictor 1044 is the same as that of the inter predictor 124 of the video encoding apparatus. In addition, one merge candidate is selected among the merge candidates in the merge list using the merge index information received from the decoder 1010. Motion information of the selected merge candidate, i.e., a motion vector of the merge candidate and a reference picture are set as the motion vector and the reference picture of the current block.

On the other hand, when mode information indicates a MVD encoding mode, the inter predictor 1044 derive MVP candidates using motion vectors of neighboring blocks of the current block and determines a MVP of the motion vector of the current block using the MVP candidates. A method of deriving the MVP candidates by the inter predictor 1044 is the same as that of the inter predictor 124 of the video encoding apparatus. When the video encoding apparatus uses any one of a plurality of MVP candidates as a MVP of the current block, the syntax element for the motion information includes MVP identification information. Accordingly, in this case, the inter predictor 1044 may select a candidate indicated by the MVP identification information from the MVP candidates as a MVP of the current block. However, when the video encoding apparatus determines a MVP by applying a predefined function to a plurality of MVP candidates, the inter predictor 1044 may apply the same function as the video encoding apparatus to determine the MVP. Once the MVP of the current block is determined, the inter predictor 1044 adds the MVP and the MVD extracted from the decoder 1010 to derive the motion vector of the current block. In addition, the inter predictor 1044 determines a reference picture referred to by the motion vector of the current block, using information on the reference picture extracted from the decoder 1010.

When the motion vector of the current block and the reference picture are determined in the merge mode or the MVD encoding mode, the inter predictor 1044 generates a prediction block of the current block using a block at a position indicated by the motion vector in the reference picture.

The adder 1050 adds the residual block output from the inverse transformer and the predicted block output from the inter predictor or the intra predictor to reconstruct the current block. Pixels in the reconstructed current block may be utilized as reference pixels for intra prediction of a block to be decoded later.

The filter unit 1060 deblock-filters boundaries between reconstructed blocks in order to remove blocking artifacts caused by block-by-block decoding and stores the deblock-filtered blocks in the memory 1070. When all blocks in one picture are reconstructed, the reconstructed picture may be used as a reference picture for inter prediction of a block in a picture to be subsequently decoded.

Figure 11:
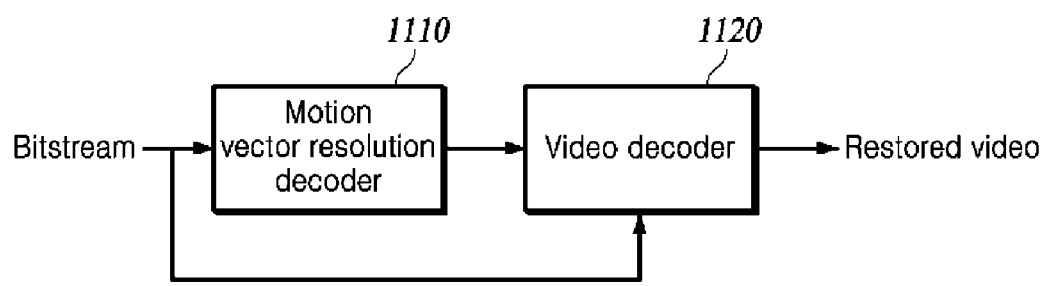
FIG. 11 is a diagram showing a video decoding apparatus 1100 according to an embodiment of the present invention.

FIG. 11 is a diagram showing an video decoding apparatus 1100 according to an embodiment of the present invention.

The video decoding apparatus 1100 according to an embodiment of the present invention may include a motion vector resolution decoder 1110 and a video decoder 1120.

The motion vector resolution decoder 1110 parses information on motion vector resolution of the current CU from a bitstream and determines motion vector resolution for estimating motion of the current CU based on the parsed information of the motion vector resolution.

The video decoder 1120 predicts and decodes the current CU using the determined motion vector of the current CU according to the motion vector resolution of the current CU.

Here, the video decoder 1120 may be implemented as the video decoding apparatus 1000 described above with reference to FIG. 10.

A function of the motion vector resolution decoder 1110 may be included in the aforementioned function of the decoder 1010 in the video decoding apparatus 1000 and may be integrated into the decoder 1010.

Figure 12:
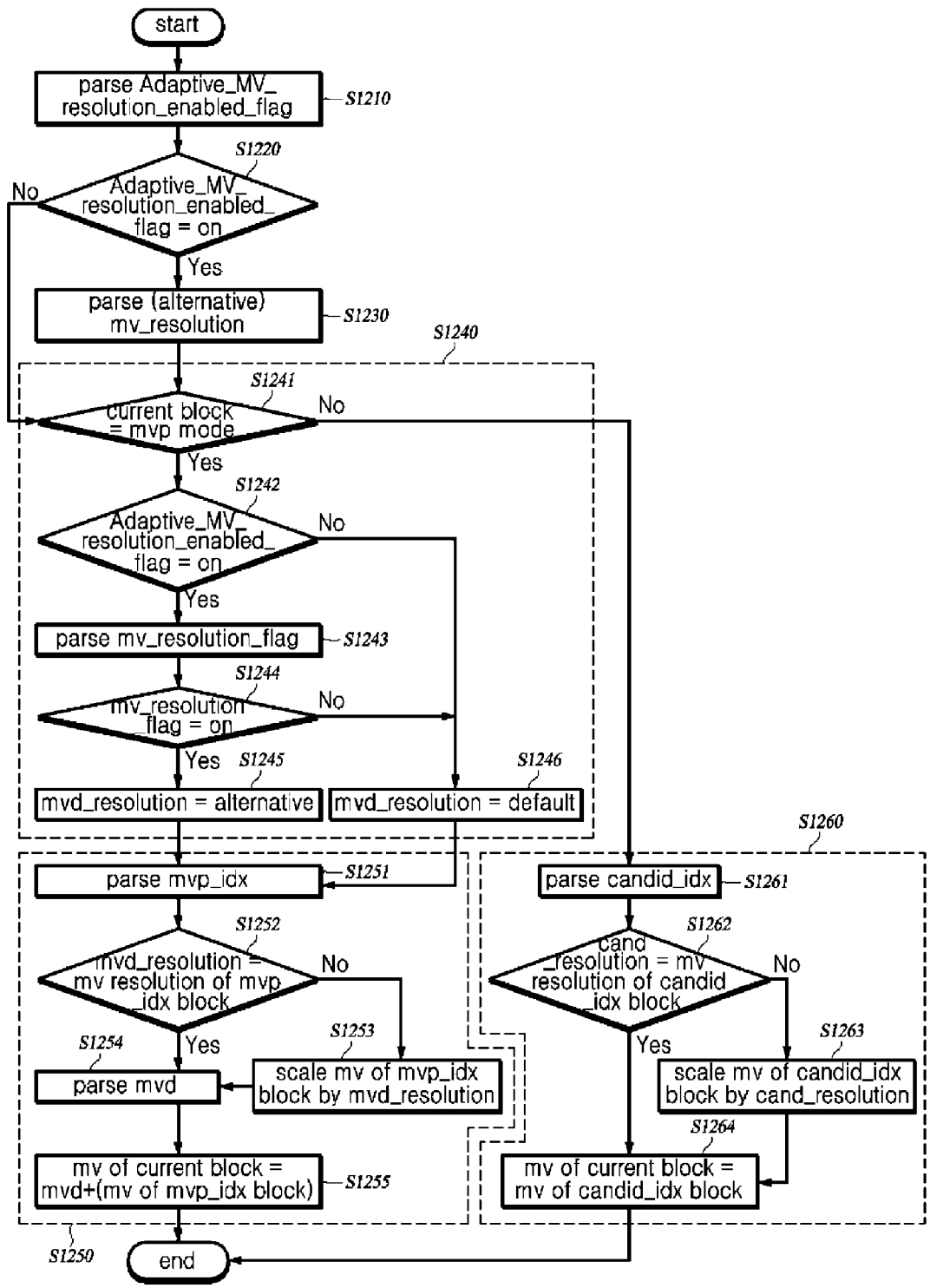
FIG. 12 is a flowchart showing a method of decoding a video at the video decoding apparatus 1100 according to the first embodiment of the present invention.

FIG. 12 is a flowchart showing a method of decoding a video at the video decoding apparatus 1100 according to a first embodiment of the present invention.

As shown in FIG. 12, in the video decoding apparatus 1100 according to the first embodiment of the present invention, the motion vector resolution decoder 1110 parses Adaptive_MV_resolution_enabled_flag (i.e., first identification information) from a bitstream (S1210). Adaptive_MV_resolution_enabled_flag means identification information indicating whether motion vector resolution is adaptively enabled, and may be determined in at least one image unit among an image sequence, a picture, a slice, and a CTU, which are a higher level image unit. Adaptive_MV_resolution_enabled_flag may be parsed from a bitstream header of at least one higher level image unit of an image sequence, a picture, a slice, and a CTU.

After parsing Adaptive_MV_resolution_enabled_flag, the motion vector resolution decoder 1110 checks whether Adaptive_MV_resolution_enabled_flag indicates that motion vector resolution of CUs in a higher level image unit is adaptively enabled (that is, when Adaptive_MV_resolution_enabled_flag is ON) or that default motion vector resolution is used as motion vector resolution of CUs in the higher level image unit (that is, when Adaptive_MV_resolution_enabled_flag is OFF) (S1220).

As the check result of operation S1220, when Adaptive_MV_resolution_enabled_flag is ON, the motion vector resolution decoder 1110 parses alternative_mv_resolution that is information on alternative resolution from a bitstream (S1230). Here, the alternative_mv_resolution may be parsed for each of the same image unit as an image unit for Adaptive_MV_resolution_enabled_flag or may be parsed from the bitstream for each image unit that is smaller than an image unit for Adaptive_MV_resolution_enabled_flag. In addition, alternative_mv_resolution may be parsed for each CU in an image unit for Adaptive_MV_resolution_enabled_flag.

After operation S1230, the motion vector resolution decoder 1110 determines motion vector resolution of the current CU that is an encoding target, according to whether an encoding mode of the current CU is a mode for encoding a MVD (S1240). When information on Adaptive_MV_resolution_enabled_flag and alternative resolution is transmitted in a bitstream for each higher image unit, motion vector resolution may also be adaptively determined for each CU in the higher image unit.

When information on Adaptive_MV_resolution_enabled_flag is transmitted for each higher image unit of one of an image sequence and a picture and alternative_mv_resolution is transmitted in a bitstream for each slice (or a CTU) that is a smaller image unit than the higher image unit, motion vector resolution may also be adaptively determined for each CU in the slice (or the CTU).

When it is checked in S1220 that Adaptive_MV_resolution_enabled_flag is OFF, the motion vector resolution decoder 1110 performs operation S1240 of determining motion vector resolution of the current CU according to whether an encoding mode of the current CU is a mode for encoding a MVD.

Here, operation S1240 may include operations S1241 to S1246.

After operation S1230, the motion vector resolution decoder 1110 may parse an encoding mode of the current CU from a bitstream and may check whether an encoding mode of the current CU is a mode (i.e., mvp mode) for encoding a MVD using a MVP (S1241).

When it is checked in S1241 that the encoding mode of the current CU is the mvp mode, the motion vector resolution decoder 1110 may check whether Adaptive_MV_resolution_enabled_flag indicates that motion vector resolution of CUs in a higher level image unit is adaptively enabled (i.e., when Adaptive_MV_resolution_enabled_flag is ON) or that default motion vector resolution is used as motion vector resolution of CUs in the higher level image unit (i.e., when Adaptive_MV_resolution_enabled_flag is OFF) (S1242).

When it is checked in S1242 that Adaptive_MV_resolution_enabled_flag is ON, the motion vector resolution decoder 1110 may parse mv_resolution_flag (i.e., second identification information) which is identification information indicating which is used as motion vector resolution of the current CU from default motion vector resolution and alternative resolution, from a bitstream (S1243) and then subsequent operations of S1244 may be performed.

Here, although mv_resolution_flag is described to be transmitted in units of CUs, in some embodiments, mv_resolution_flag may be parsed in units of CTUs, whether a CU is an mvp mode may be checked for each CU in a corresponding CTU, and when the corresponding CU is an mvp mode, subsequent operations of S1244 may be performed.

After parsing mv_resolution_flag, the motion vector resolution decoder 1110 may check a value of mv_resolution_flag (S1244).

When it is checked in S1244 that mv_resolution_flag indicates that alternative resolution is used as motion vector resolution of the current CU (i.e., when mv_resolution_flag is ON), the motion vector resolution decoder 1110 may determine the alternative resolution as the motion vector resolution of the current CU (S1245).

When it is checked in S1244 that mv_resolution_flag indicates that default motion vector resolution is used as motion vector resolution of the current CU (i.e., when mv_resolution_flag is OFF), the motion vector resolution decoder 1110 may determine default motion vector resolution as the motion vector resolution of the current CU (S1246).

When it is checked in S1242 Adaptive_MV_resolution_enabled_flag is OFF, the motion vector resolution decoder 1110 may determine default motion vector resolution as the motion vector resolution of the current CU (S1246).

For example, when Adaptive_MV_resolution_enabled_flag indicating whether motion vector resolution is adaptively enabled and alternative_mv_resolution syntax indicating alternative resolution is located in an SPS, whether the method according to the present invention is applied may be determined for each image sequence unit.

For example, when Adaptive_MV_resolution_enabled_flag in an SPS is ON, an alternative_mv_resolution value (i.e., alternative resolution) of the SPS is 4 pixels, and default motion vector resolution is ¼-pixel, motion vector resolutions of all CUs that are encoding targets in an image sequence that refers to the SPS may be determined as ¼-pixel or 4-pixel. That is, when mv_resolution_flag that is header information of the current CU is OFF, motion vector resolution of the current CU may be determined as ¼-pixel corresponding to default motion vector resolution, and when mv_resolution_flag of the current CU is ON, motion vector resolution of the current CU may be determined as 4-pixel corresponding to alternative resolution.

When Adaptive_MV_resolution_enabled_flag and alternative_mv_resolution syntax is located in a PPS (or a slice header), whether the method according to the present invention is applied may be determined in units of pictures (or units of slices).

For example, when Adaptive_MV_resolution_enabled_flag in the PPS is ON, an alternative_mv_resolution value (i.e., alternative resolution) of the PPS is 4-pixel and default motion vector resolution is ¼-pixel, motion vector resolutions of all CUs that is encoding targets in a picture (or a slice) that refers to a PPS (or a slice header) may be determined as ¼-pixel or 4-pixel. That is, when mv_resolution_flag that is header information of the current CU is OFF, motion vector resolution of the current CU may be determined as ¼-pixel corresponding to default motion vector resolution, and when mv_resolution_flag of the current CU is ON, motion vector resolution of the current may be determined as 4-pixel corresponding to alternative resolution.

When Adaptive_MV_resolution_enabled_flag is On in an SPS (or a PPS), an alternative_mv_resolution value of a header of a slice (or a CTU) which is a smaller image unit than an image sequence (or a picture) is 4 pixel, and default motion vector resolution is ¼-pixel, motion vector resolutions of all CUs that are encoding targets in a corresponding slice (or a CTU) may be determined as ¼-pixel corresponding to default motion vector resolution or 4-pixel corresponding to an alternative resolution, and thus the motion vector of the current CU may be represented in a ¼-pixel or 4-pixel resolution. That is, when mv_resolution_flag that is header information of the current CU is 0 (i.e., OFF), motion information of the current CU is represented in ¼-pixel resolution, and when mv_resolution_flag of the current CU is ON, motion information of the current CU is represented in 4-pixel resolution.

When Adaptive_MV_resolution_enabled_flag is ON in an SPS (or a PPS), an alternative_mv_resolution value of a header of a slice (or a CTU) which is a smaller image unit than an image sequence (or a picture) is 0, and default motion vector resolution is ¼-pixel, motion vector resolutions of all CUs that are encoding targets in a corresponding slice (or a CTU) may be determined in ¼-pixel corresponding to default motion vector resolution. Here, mv_resolution_flag as header information of a CU may not be required.

When Adaptive_MV_resolution_enabled_flag may be ON in an SPS (or a PPS), motion vector resolutions of all CUs that are encoding targets in a corresponding slice (or a CTU) may be determined depending on a value of Alternative_enabled_flag of a header of a slice (or a CTU) that is a smaller image unit than an image sequence (or a picture). For example, when Alternative_enabled_flag is OFF and default motion vector resolution is ¼-pixel, the motion vector resolutions of all CUs in a corresponding slice (or a CTU) may be represented in ¼-pixel corresponding to default motion vector resolution, and mv_resolution_flag that is header information of the CU that is an encoding target may not be required. On the other hand, when Alternative_enabled_flag is ON, an alternative_mv_resolution value is 4-pixel, and default motion vector resolution is ¼-pixel, motion vector resolutions of all CUs in a corresponding slice (or a CTU) may be determined as ¼-pixel corresponding to default motion vector resolution or 4-pixel corresponding to an alternative resolution. That is, when mv_resolution_flag of the current CU is 0 (i.e., OFF), motion information of the current CU may be represented in a ¼-pixel resolution, while when mv_resolution_flag of the current CU is ON, the motion information of the current CU may be represented in a 4-pixel resolution.

Figure 13A:
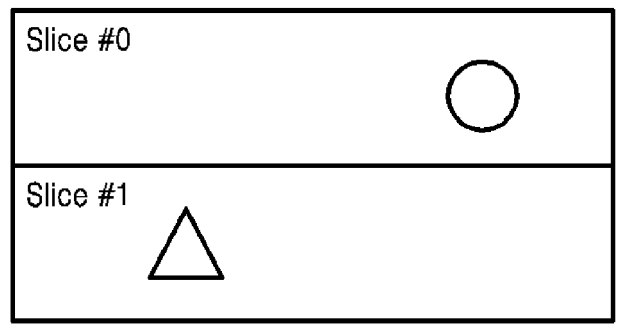
FIGS. 13A and 13B are a diagram showing an example of adaptive determination of resolution.
Figure 13B:
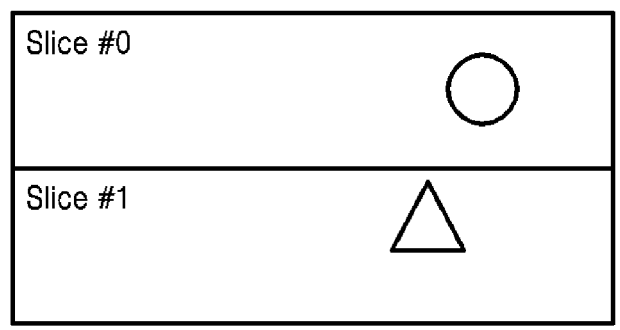

FIGS. 13A and 13B are a diagram showing an example of adaptive determination of resolution.

When Adaptive_MV_resolution_enabled_flag of an SPS header is ON, an alternative_mv_resolution of a header of slice #0 is 2-pixel, and default motion vector resolution (default MV resolution) is ¼-pixel, motion vector resolution of a current CU including a circle in the corresponding slice #0 may be determined in ¼-pixel corresponding to the default motion vector resolution or 2-pixel corresponding to alternative resolution. In this case, when mv_resolution_flag that is header information of the current CU is OFF, motion vector of the current CU is represented in a ¼-pixel unit corresponding to the default motion vector resolution, while when mv_resolution_flag of the current CU is ON, the motion vector of the current CU is represented in a 2-pixel unit corresponding to alternative_mv_resolution.

When an alternative_mv_resolution of a header of slice #1 is 4-pixel, motion vector resolution of the current CU including a triangle in slice #1 may be determined in ¼-pixel corresponding to default motion vector resolution or 4-pixel corresponding to alternative resolution. In this case, when mv_resolution_flag that is header information of the current CU is OFF, the motion vector of the current CU is represented in ¼-pixel corresponding to default motion vector resolution, while when mv_resolution_flag of the current CU is ON, the motion vector of the current CU is represented in a 4-pixel unit corresponding to alternative resolution.

After operation S1245 or S1246, the video decoder 1120 may derive the motion vector of the current block using a MVP (S1250).

Here, operation S1250 may include operations S1251 to S1255.

In operation S1251, the video decoder 1120 may derive MVP candidates and may parse, from a bitstream, information (mvp_idx) for identifying the MVP of the current CU from the MVP candidates. Here, a neighboring block used for MVP candidates may use some or all of the left block L, the above block A, the above-right block AR, the bottom-left block BL, and the above-left block AL, which are adjacent to the current CU in the current picture shown in FIG. 3.

The video decoder 1120 may check whether motion vector resolution of a block corresponding to mvp_idx is the same as motion vector resolution of the current CU (S1252).

Upon checking that the motion vector resolution of the block corresponding to mvp_idx is the same as the motion vector resolution of the current CU, the video decoder 1120 may decode the MVD from the bitstream (S1254). Upon checking that the motion vector resolution of the block corresponding mvp_idx is different from the motion vector resolution of the current CU, the video decoder 1120 may scale the MVP of the current block such that resolution of the MVP is the same as the motion vector resolution of the current CU (S1253), and may parse the MVD from the bitstream (S1254).

The video decoder 1120 adds the MVD parsed from the bitstream and the MVP to generate the motion vector of the current CU (S1255).

For example, when the motion vector resolution of the current CU is 2-pixel, motion vector resolution of a block corresponding to mvp_idx is ¼-pixel, and a motion vector of a block corresponding to mvp_idx is set to 3, an actual motion vector of the block corresponding to mvp_idx corresponds to 0.75. When scaling is performed according to 2-pixel motion vector resolution corresponding to the motion vector resolution of the current CU, the actual motion vector of the block corresponding to mvp_idx is converted into 0. Such a conversion equation may be represented according to Equation 1 below.

$$MV' = \text{Round}(MV \times \text{neighbor\_MV\_Resol} / \text{curr\_MV\_Resol}) \quad \text{[Equation 1]}$$

Here, MV denotes a motion vector of a block corresponding to mvp_idx, neighboring_MV_resol denotes a motion vector resolution of the block corresponding to mvp_idx, current_MV_resol denotes a motion vector resolution of the current CU, MV' is a scaled motion vector, and Round denotes rounding off operation.

Adaptive_MV_resolution_enabled_flag, mv_resolution_flag, alternative_mv_resolution, and the like may each be separately for each of x and y components of a motion vector, and the motion vector resolution of the CU may also be separately calculated for each of x and y components according to Equation 2 below.

$$MVx' = \text{Round}(MVx \times \text{neighbor\_MVx\_Resol} / \text{curr\_MVx\_Resol})$$

$$MVy' = \text{Round}(MVy \times \text{neighbor\_MVy\_Resol} / \text{curr\_MVy\_Resol}) \quad \text{[Equation 2]}$$

As the check result of operation S1241, upon checking that the encoding mode of the current CU is not the mvp mode (e.g., a merge mode), the video decoder 1120 may derive the motion vector of the current CU from the motion vectors (i.e., merge candidates) of a temporal or spatial neighboring blocks (S1260).

Here, operation S1260 may include operations S1261 to S1264.

As the check result of operation S1241, upon checking that the encoding mode of the current CU is not an mvp mode, the video decoder 1120 parses, from the bitstream, information (candid_idx) for identifying the motion vector of the current CU from merge candidates of the current CU, (S1261). Merge candidates of the current CU may use some or all of the left block L, the above block A, the above-right block AR, the bottom-left block BL, and the above-left block AL, which are adjacent to the current CU in the current picture shown in FIG. 3. In addition, a block positioned in a reference picture (which is the same or different from a reference picture used to predict the current CU) other than the current picture in which the current CU is positioned may be used as a motion vector candidate (i.e., a merge candidate). For example, a co-located block of the current block in the reference picture or blocks adjacent to the co-located block may be further used as the merge candidate.

The video decoder 1120 may check whether motion vector resolution of a block corresponding to candid_idx parsed from a bitstream is the same as motion vector resolution predefined for a merge mode (S1262). Here, the motion vector resolution predefined for the merge mode may be motion vector resolution that is defined in any one unit of an image sequence, a picture, and a slice.

The video decoder 1120 may set the motor vector of the block corresponding to candid_idx as the motion vector of the current CU when the motion vector resolution of the block corresponding to candid_idx is the same as motion vector resolution predefined for the merge mode (S1264). When the motion vector resolution of the block corresponding to candid_idx is different from the predefined motion vector resolution, the video decoder 1120 may scale the motion vector of the block corresponding to candid_idx such that the motion vector of the block corresponding to candid_idx is the same as the predefined motion vector resolution (S1263), and may set the scaled motion vector as the motion vector of the current CU (S1264).

For reference, operations S1240, S1250, and S1260 may be sequentially and repeatedly performed for each CU.

Figure 14:
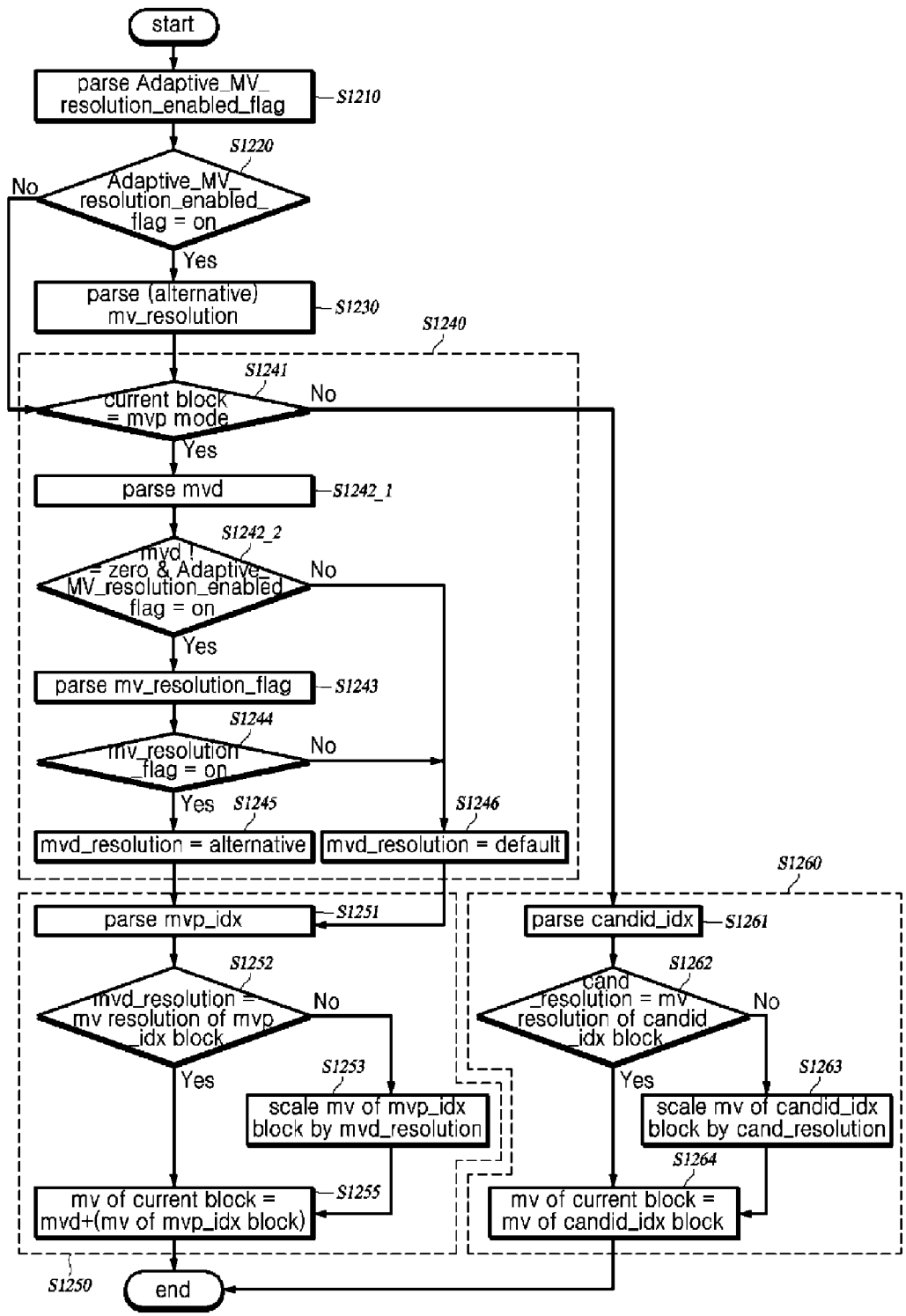
FIG. 14 is a flowchart showing the case where some operations are added to FIG. 12.

FIG. 14 is a flowchart showing the case where some operations are added to FIG. 12.

In FIG. 14, operation S1240 may include operations S1241, S12421, S1242_2, S1243, S1244, S1245, and S1246. In FIG. 14, operation S1250 may include operations S1251, S1252, S1253, and S1255.

Compared with FIG. 12, FIG. 14 includes operations S1242_1 and S1242_2 in operation S1240 instead of operation S1242 of FIG. 12, and excludes operation S1254 from operation S1250 of FIG. 12.

For reference, among functional blocks of FIG. 14, a functional block with the same reference numeral as a numeral reference of a block of FIG. 12 performs the same operation as the block of FIG. 12 unless it has a clearly different meaning in the context. For example, operation S1243 of FIG. 14 is the same as operation S1243 of FIG. 12.

In FIG. 14, when it is checked in S1241 that the encoding mode of the current CU is a mode (i.e., the mvp mode) for encoding a MVD using the MVP, the video decoder 1120 may parse information (mvd) on the MVD from the bitstream (S1242_1).

After the MVD is parsed in operation S1242_1, the motion vector resolution decoder 1110 may check whether the MVD is not 0 and whether Adaptive_MV_resolution_enabled_flag is ON (S1242_2). When the MVD is not 0 and Adaptive_MV_resolution_enabled_flag is ON, the motion vector resolution decoder 1110 may proceed to operation S1243. When the MVD is 0 or Adaptive_MV_resolution_enabled_flag is not ON, the motion vector resolution decoder 1110 may proceed to operation S1246.

In operation S1252 of FIG. 14, upon checking that the motion vector resolution of the block corresponding to mvp_idx is the same as motion vector resolution of the current CU, the video decoder 1120 adds the MVD and the MVP to calculate the motion vector of the current CU (S1255). In operation S1252 of FIG. 14, upon checking that the motion vector resolution of the block corresponding to mvp_idx is not the same as the motion vector resolution of the current CU, the video decoder 1120 may perform operation S1253 of scaling the MVP such that the resolution of the MVP is the same as the motion vector resolution of the current CU. After operation S1253, the video decoder 1120 may perform operation S1255 of adding the MVD and the MVP to calculate the motion vector of the current CU.

Operation S1251 may be performed prior to operation S1242_1 or may be performed between operations S1242_1 and S1242_2.

Figure 15:
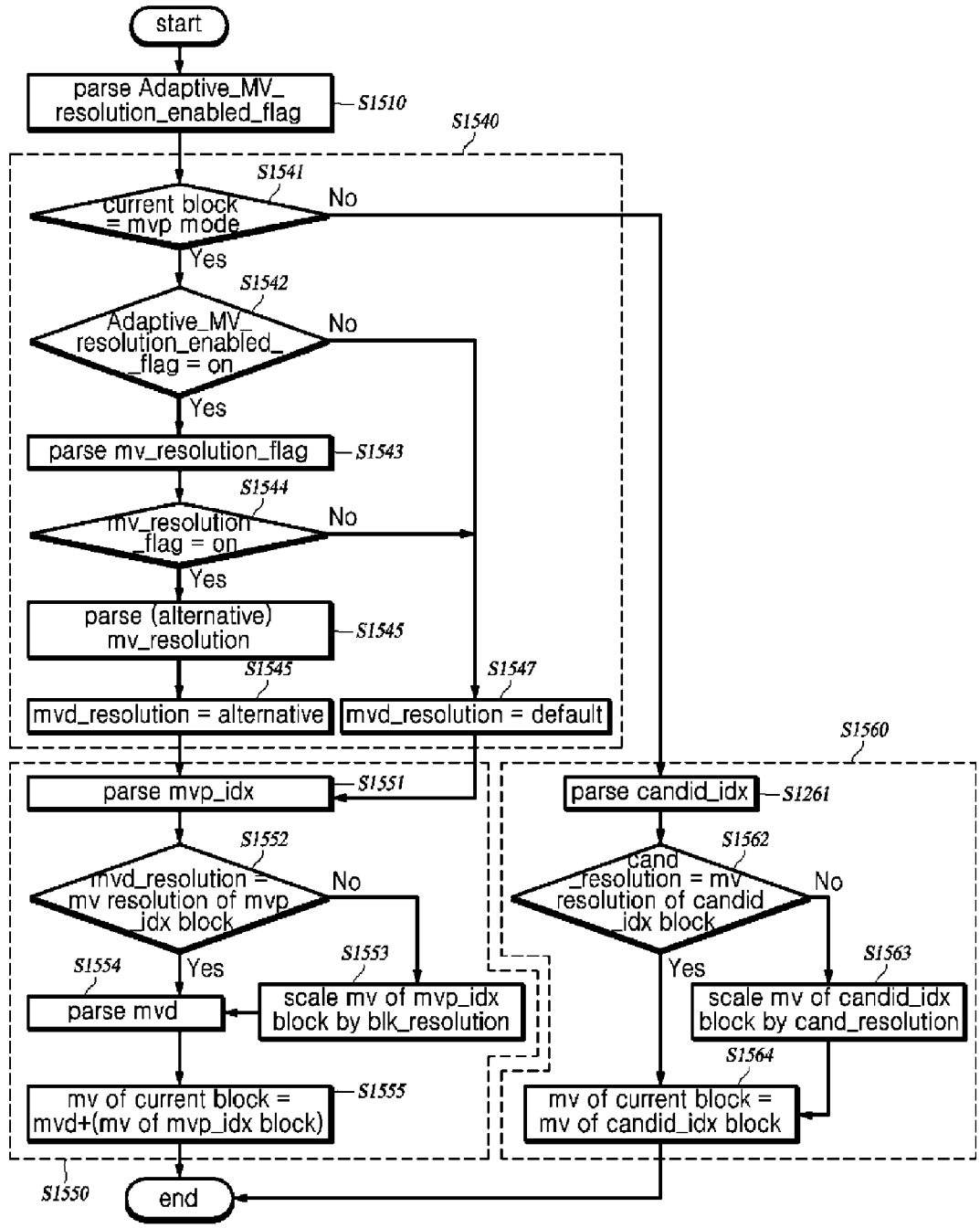
FIG. 15 is a flowchart showing a method of decoding a video at the video decoding apparatus 1100 according to a second embodiment of the present invention.

FIG. 15 is a flowchart showing a method of decoding a video at the video decoding apparatus 1100 according to a second embodiment of the present invention.

As a detailed example of the case of FIG. 15, when Adaptive_MV_resolution_enabled_flag is located in an SPS (a PPS, a slice, or a CTU header) and mv_resolution_flag and alternative_mv_resolution information are located in a header of a CU that is an encoding target, whether to activate the adaptive motion vector resolution mode according to the present invention may be determined in units of image sequences (in units of pictures, in units of slices, or in units of CTUs) according to the Adaptive_MV_resolution_enabled_flag value, and motion vector resolution of a CU may be adjusted through a CU-by-CU based selection according to an mv_resolution_flag value.

For example, when Adaptive_MV_resolution_enabled_flag in an SPS header (a PPS header, a slice header, or a CTU header) is ON, default motion vector resolution is ¼-pixel, and mv_resolution_flag as header information of the current CU is OFF, alternative_mv_resolution information is not required to determine the motion vector resolution of the current CU. In this case, the motion vector resolution of the current CU may be determined in ¼-pixel corresponding to the default motion vector resolution and the motion vector of the current CU may be represented in a ¼-pixel unit.

On the other hand, when mv_resolution_flag is ON and an alternative_mv_resolution value of the CU header is 4-pixel, the motion vector resolution of the current CU may be determined as 4-pixel corresponding to the alternative resolution and the motion vector of the current CU may be represented in a 4-pixel resolution corresponding to the alternative resolution.

As shown in FIG. 15, in the video decoding apparatus 1100 according to the second embodiment of the present invention, the motion vector resolution decoder 1110 may parse Adaptive_MV_resolution_enabled_flag from a bitstream (S1510). Adaptive_MV_resolution_enabled_flag means identification information indicating whether the motion vector resolution is adaptively enabled and may be determined in at least one image unit (a higher level image unit than a CU) among an image sequence, a picture, a slice, and a CTU. Adaptive_MV_resolution_enabled_flag may be parsed from a bitstream header of at least one image unit among an image sequence, a picture, a slice, and a CTU.

After parsing Adaptive_MV_resolution_enabled_flag for each image unit of at least one of an image sequence, a picture, a slice, or a CTU, the motion vector resolution decoder 1110 may determine motion vector resolution for each block according to whether the encoding mode of each block in an image unit in which Adaptive_MV_resolution_enabled_flag is parsed is a mode (i.e., an mvp mode) for encoding the MVD (S1540).

Here, operation S1540 may include operations S1541 to S1547.

After operation S1510, the motion vector resolution decoder 1110 may parse the encoding mode of the current CU from the bitstream and may check whether the encoding mode of the current CU is a mode (i.e., an mvp mode) for encoding the MVD using the MVP (S1541).

When the encoding mode of the current CU is the mvp mode, it is checked whether Adaptive_MV_resolution_enabled_flag indicates that motion vector resolutions of CUs in the higher level image unit are adaptively enabled (i.e., Adaptive_MV_resolution_enabled_flag is ON) or that the default motion vector resolution is used as motion vector resolution in the CUs in the higher level image unit (i.e., Adaptive_MV_resolution_enabled_flag is OFF) (S1542).

When Adaptive_MV_resolution_enabled_flag is OFF, the motion vector resolution decoder 1110 may use the default motion vector resolution as the motion vector resolution of the current CU (S1547).

When Adaptive_MV_resolution_enabled_flag is ON, the motion vector resolution decoder 1110 may parse, from the bitstream, mv_resolution_flag that is identification information indicating which is used as the motion vector resolution of the current CU from the default motion vector resolution and the alternative resolution (S1543).

After parsing mv_resolution_flag, the motion vector resolution decoder 1110 may check the value of mv_resolution_flag (S1544).

When mv_resolution_flag indicates that the alternative resolution is used as the motion vector resolution of the current CU (i.e., when mv_resolution_flag is ON), the motion vector resolution decoder 1110 may parse alternative_mv_resolution that is information on the alternative resolution of the current CU, from the bitstream (S1545) and may set the parsed alternative resolution as the motion vector resolution of the current CU (S1546).

When mv_resolution_flag indicates that the default motion vector resolution is used as the motion vector resolution of the current CU (i.e., when mv_resolution_flag is OFF), the motion vector resolution decoder 1110 may set the default motion vector resolution as the motion vector resolution of the current CU (S1547).

Although mv_resolution_flag and/or alternative_mv_resolution information have been transmitted in units of CUs as described above, in some embodiments, mv_resolution_flag and/or alternative_mv_resolution may be encoded in units of CTUs. It is checked whether an encoding mode for each CU in the corresponding CTU is the mvp mode, and then subsequent operations of operation S1540 may be performed for CUs of which encoding modes are the mvp mode.

Figure 16A:
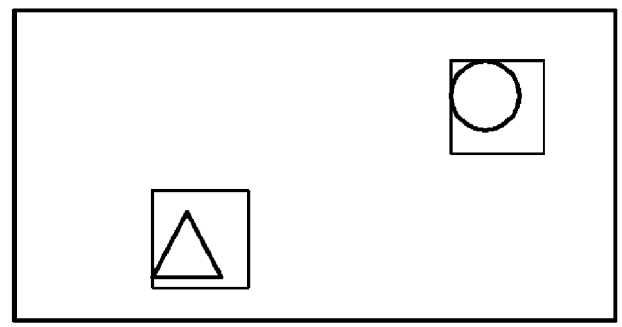
FIGS. 16A and 16B are a diagram showing another example of adaptive determination of resolution.
Figure 16B:
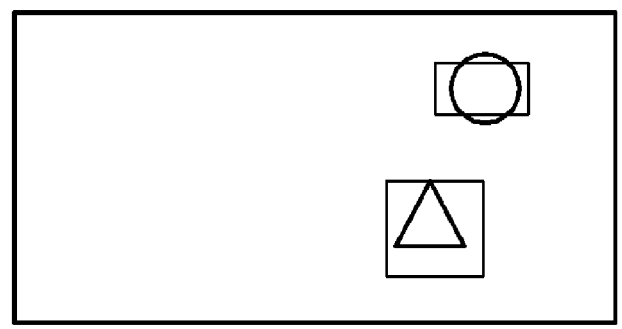

FIGS. 16A and 16B are a diagram showing another example of adaptive determination of resolution.

For example, when Adaptive_MV_resolution_enabled_flag in an SPS (a PPS, a slice header, or a CTU header) is ON, the default motion vector resolution is ¼-pixel, mv_resolution_flag in a header of a CU including a circle in the corresponding image sequence is ON, and an alternative_mv_resolution is 1 pixel, motion vector resolution of the corresponding CU may be determined as 1-pixel corresponding to an alternative resolution and the motion vector of the CU may be represented in a 1-pixel resolution.

When mv_resolution_flag in a header of a CU including a triangle in the corresponding image sequence is ON and an alternative_mv_resolution is 4-pixel, the motion vector resolution of the corresponding CU may be determined as 4-pixel corresponding to the alternative resolution and the motion vector of the CU may be represented in a 4-pixel resolution corresponding to the alternative resolution. In the case of a CU in which an mv_resolution_flag value is set to be Off, the motion vector resolution of the CU may be determined as ¼-pixel corresponding to the default motion vector resolution and the motion vector of the CU may be represented in a ¼-pixel resolution corresponding to the default motion vector resolution.

After operation S1546 or S1547, the video decoder 1120 may derive the motion vector of the current block using a MVP (S1550).

In FIG. 15, operation S1550 may include operations S1551 to S1555.

Operations S1551 to S1555 are similar to operations S1251 to S1255, respectively, and thus, a detailed description of operations S1551 to S1555 is omitted.

When it is checked in S1541 that the encoding mode of the corresponding CU is not an mvp mode (e.g., a merge mode), the video decoder 1120 may derive the motion vector of the current CU from a motion vector (i.e., merge candidates) of a temporal or spatial neighboring block (S1560).

Here, operation S1560 may include operations S1561 to S1564.

Operations S1561 to S1564 are similar to operations S1261 to S1264, respectively, and thus, a detailed description of operations S1561 to S1564 is omitted.

Figure 17:
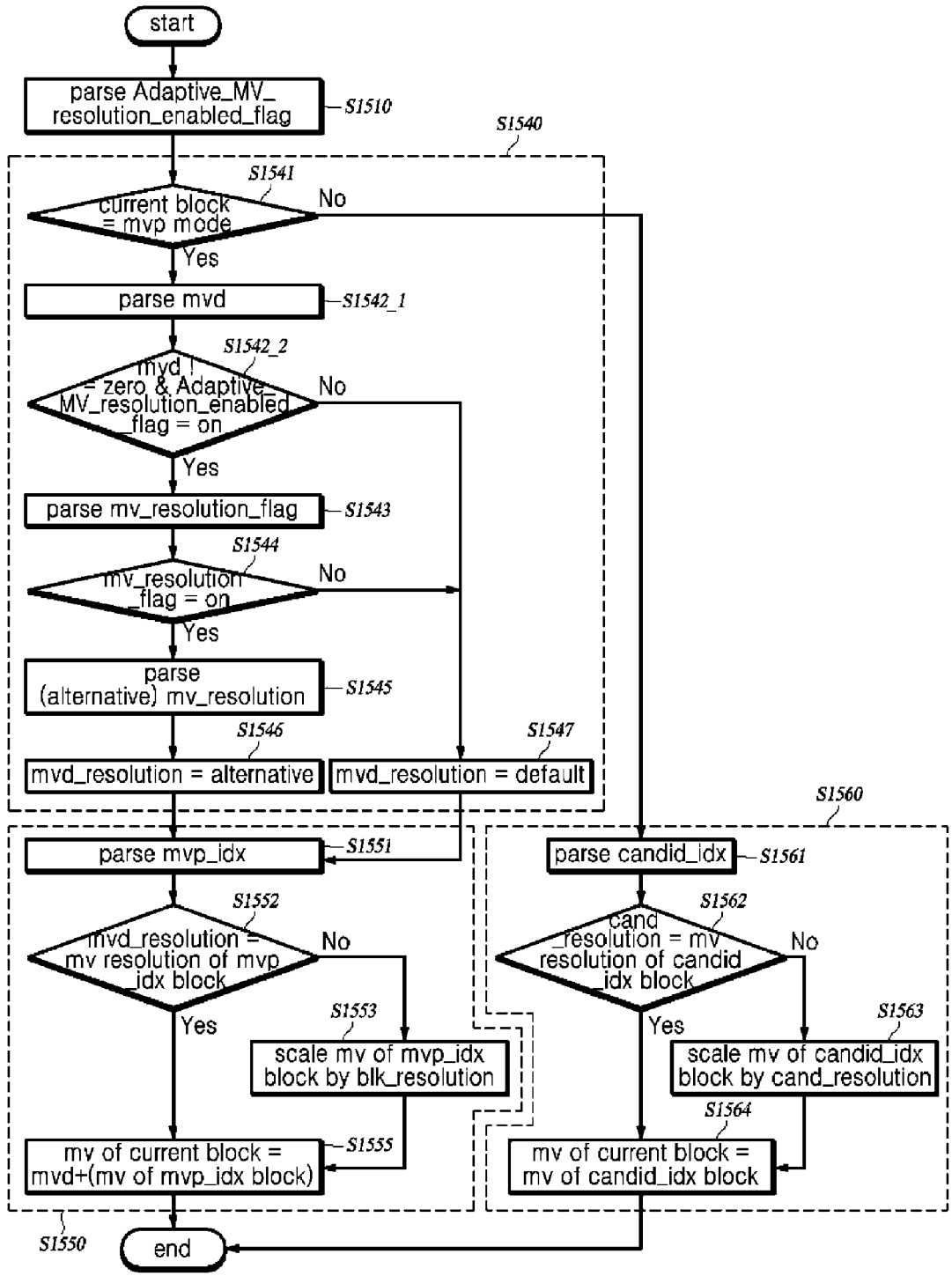
FIG. 17 is a flowchart showing the case where some operations are added to FIG. 15.

FIG. 17 is a flowchart showing the case where some operations are added to FIG. 15.

In FIG. 17, operation S1540 may include operations S1541, S15421, S1542_2, S1543, S1544, S1545, S1546, and S1547. In FIG. 17, operation S1550 may include operations S1551, S1552, S1553, and S1555.

For reference, among functional blocks of FIG. 17, a functional block with the same reference numeral as a reference numeral of a block of FIG. 15 performs the same operation as the block of FIG. 15 unless it has a clearly different meaning in the context. For example, operation S1543 of FIG. 17 is the same as operation S1543 of FIG. 15.

When it is checked in operation S1541 of FIG. 17 that the encoding mode of the current CU is a mode (i.e., an mvp mode) for encoding a MVD using the MVP is checked, the video decoder 1120 may parse information on the MVD from the bitstream (S1542_1).

After parsing the MVD in operation S1542_1, the motion vector resolution decoder 1110 may check whether the MVD is not 0 and whether Adaptive_MV_resolution_enabled_flag is ON (S1542_2). When the MVD is not 0 and Adaptive_MV_resolution_enabled_flag is ON, the motion vector resolution decoder 1110 may proceed to operation S1543. When the motion vector is difference 0 or Adaptive_MV_resolution_enabled_flag is not ON, motion vector resolution decoder 1110 may proceed to operation S1547.

Operation S1551 may be performed prior to operation S1542_1 or may be performed between operations S1542_1 and S1542_2.

Operations S1551, S1552, S1553, and S1555 of FIG. 17 are similar to operations S1251, S1252, S1253, and S1255 of FIG. 14, respectively, and thus, a detailed description of operations S1551, S1552, S1553, and S1555 of FIG. 17 is omitted.

Figure 18:
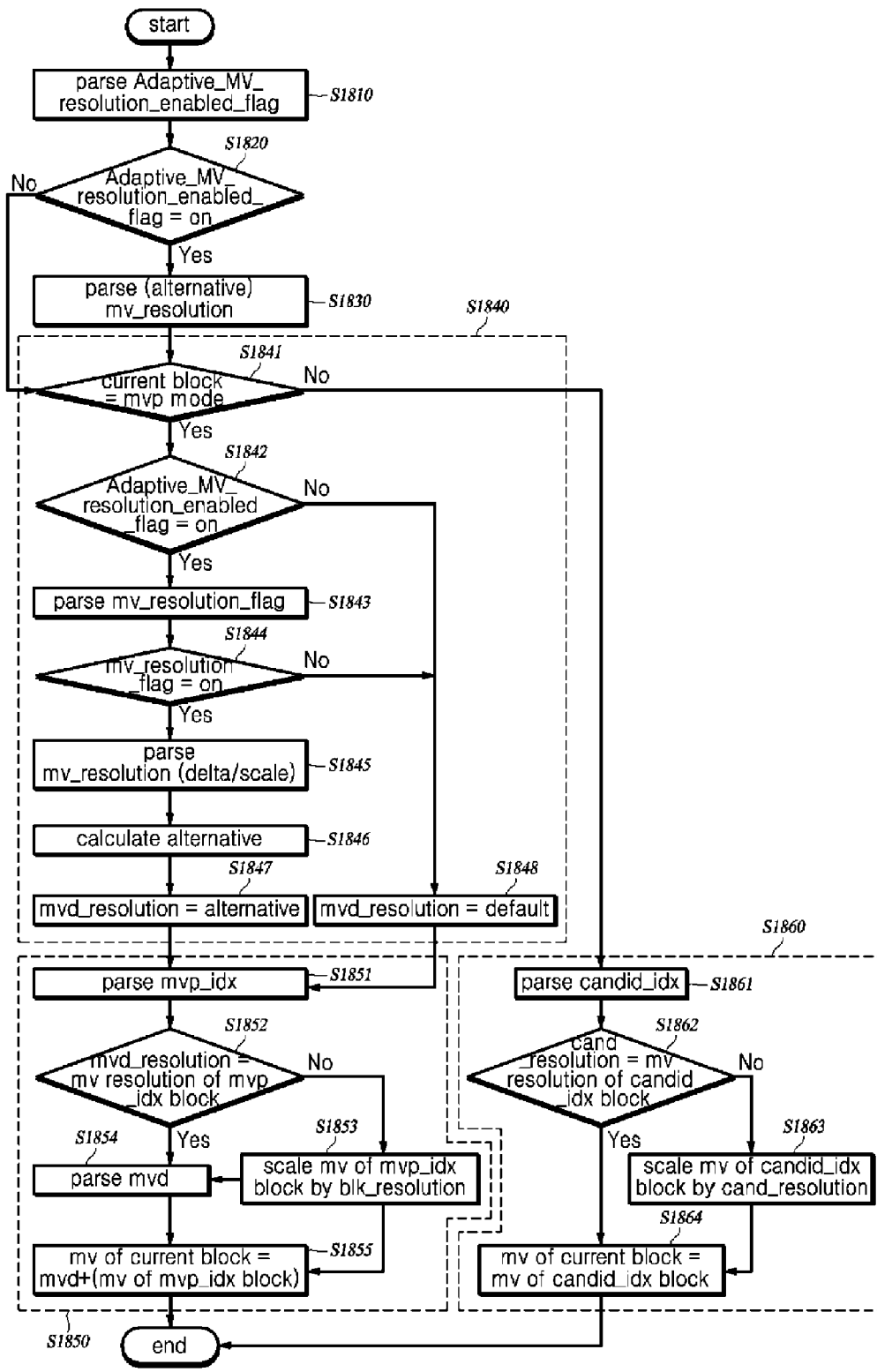
FIG. 18 is a flowchart showing a method of decoding a video at the video decoding apparatus 1100 according to a third embodiment of the present invention.

FIG. 18 is a flowchart showing a method of decoding a video at the video decoding apparatus 1100 according to a third embodiment of the present invention.

As shown in FIG. 18, in the video decoding apparatus 1100 according to the third embodiment of the present invention, the motion vector resolution decoder 1110 may parse Adaptive_MV_resolution_enabled_flag from a bitstream (S1810). Adaptive_MV_resolution_enabled_flag means identification information indicating whether motion vector resolution is adaptively enabled, and may be determined in at least one image unit among an image sequence, a picture, a slice, or a CTU, which are a higher level image unit. Adaptive_MV_resolution_enabled_flag may be parsed from a bitstream header of an image unit of at least one of an image sequence, a picture, a slice, and a CTU.

The motion vector resolution decoder 1110 may check whether Adaptive_MV_resolution_enabled_flag indicates that motion vector resolution is adaptively enabled in the higher level image unit (i.e., in all CUs in the higher level image unit) of at least one of an image sequence, a picture, a slice, and a CTU (i.e., in the case of ON) or that the default motion vector resolution is used as motion vector resolution of all CUs in the higher level image unit (i.e., in the case of OFF) (S1820).

When it is checked in operation S1820 that Adaptive_MV_resolution_enabled_flag is OFF, the motion vector resolution decoder 1110 may use the default motion vector resolution as motion vector resolution of the corresponding CUs in the corresponding image unit (S1822).

When it is checked in operation S1820 that Adaptive_MV_resolution_enabled_flag is ON, the motion vector resolution decoder 1110 may parse alternative_mv_resolution that is information on alternative resolution, from the bitstream (S1830). Here, the alternative_mv_resolution may be parsed from the bitstream for each of the same image unit as an image unit in which Adaptive_MV_resolution_enabled_flag is transmitted.

Alternatively, alternative_mv_resolution may be parsed from the bitstream for each image unit that is smaller than an image unit in which Adaptive_MV_resolution_enabled_flag is transmitted and is larger than a CU that is a block unit in which motion vector resolution is determined. For example, when the image unit in which Adaptive_MV_resolution_enabled_flag is transmitted is one of an image sequence and a picture, a unit in which alternative_mv_resolution is parsed may be a slice (or a CTU).

Alternatively, alternative_mv_resolution may be parsed for each CU in an image unit for Adaptive_MV_resolution_enabled_flag.

In addition, alternative_mv_resolution may not be parsed at any position.

After operation S1830, the motion vector resolution decoder 1110 may determine motion vector resolution of the current CU according to whether the encoding mode of the current CU is a mode for encoding the MVD (S1840).

Here, operation S1840 may include operations S1841 to S1848.

After operation S1830, the motion vector resolution decoder 1110 may parse the encoding mode of the current CU from the bitstream and may check whether the encoding mode of the current CU is a mode (i.e., an mvp mode) for encoding the MVD using the MVP (S1841).

When the encoding mode of the current CU is the mvp mode, the motion vector resolution decoder 1110 may check whether Adaptive_MV_resolution_enabled_flag indicates that motion vector resolution of CUs in the higher level image unit is adaptively enabled (i.e., when Adaptive_MV_resolution_enabled_flag is ON) or that the default motion vector resolution is used as motion vector resolution of CUs in the higher level image unit (i.e., when Adaptive_MV_resolution_enabled_flag is OFF) (S1842).

When Adaptive_MV_resolution_enabled_flag is ON, the motion vector resolution decoder 1110 may parse, from the bitstream, mv_resolution_flag that is identification information indicating which resolution is used as the motion vector resolution of the current CU from the default motion vector resolution and the alternative resolution (S1843).

On the other hand, when Adaptive_MV_resolution_enabled_flag is OFF, the motion vector resolution decoder 1110 may determine the default motion vector resolution as the motion vector resolution of the current CU (S1848).

After parsing mv_resolution_flag of the current CU in operation S1843, the motion vector resolution decoder 1110 may check the value of mv_resolution_flag (S1844).

When it is checked in operation S1844 that mv_resolution_flag indicates that the motion vector resolution of the current CU is determined using a resolution differential value that is a differential value between the motion vector resolution of the current CU and a motion vector resolution of a previous CU (i.e., when mv_resolution_flag is ON), the motion vector resolution decoder 1110 may parse mv_resolution_delta that is information on the differential value between the motion vector resolution of the current CU and the motion vector resolution of the previous CU, from the bitstream (S1845). Here, when the alternative_mv_resolution value is not located and the current CU is the first CU in a decoding order among CUs in the higher level image unit, mv_resolution_delta may represent information indicating the motion vector resolution of the current CU.

The motion vector resolution decoder 1110 may calculate the motion vector resolution of the current CU using the mv_resolution_delta (S1846) and may set the calculation result as the motion vector resolution of the current CU (S1847).

When it is checked in operation S1844 that mv_resolution_flag indicates that the default motion vector resolution is used as the motion vector resolution of the current CU (i.e., when mv_resolution_flag is OFF), the motion vector resolution decoder 1110 may determine the default motion vector resolution as the motion vector resolution of the current CU (S1848).

In operation S1846, when the current CU is the first CU in a decoding order among CUs in the higher level image unit, the motion vector resolution decoder 1110 may determine an mv_resolution_delta as the motion vector resolution of the current CU. When the current CU is a CU after the first CU in the decoding order, the motion vector resolution decoder 1110 may add mv_resolution_delta to the motion vector resolution of a CU that has been encoded immediately prior to the current CU in the decoding order and to generate the motion vector resolution of the current CU. In this case, the motion vector resolution decoder 1110 does not require alternative_mv_resolution to generate the motion vector resolution of the current CU, and thus, an operation of parsing alternative_mv_resolution from the bitstream may be omitted.

For example, when Adaptive_MV_resolution_enabled_flag in a slice header is ON, the default motion vector resolution is ¼-pixel, and mv_resolution_flag that is header information of the current CU is OFF, the mv_resolution_delta information may not be required to determine the motion vector resolution of the current CU. In this case, the motion vector resolution of the current CU may be set as ¼-pixel that is default motion vector resolution and the motion vector of the current CU may be represented in a ¼-pixel resolution corresponding to default motion vector resolution of the motion vector.

On the other hand, when mv_resolution_flag is ON, the current CU is the first CU in the decoding order, and an mv_resolution_delta of the current CU is 4-pixel, the motion vector resolution of the current CU may be determined as 4-pixel corresponding to the mv_resolution_delta and the motion vector of the current CU may be represented in a 4-pixel resolution. When the current CU is not the first CU in the decoding order, in the case that mv_resolution_flag of the current CU is ON and the mv_resolution_delta of the current CU is 0, the motion vector resolution of the current CU may be set as 4-pixel that is obtained by adding the mv_resolution_delta of the current CU to the motion vector resolution of the previous CU of the current CU, and the motion vector of the current CU may be represented in a 4-pixel resolution.

When the current CU is not the first CU in the decoding order, in the case that mv_resolution_flag of the current CU is ON and the mv_resolution_delta of the current CU is −2 pixel, the motion vector resolution of the current CU may be set as 2-pixel that is obtained by adding −2 pixel corresponding to the mv_resolution_delta to 4-pixel that is the motion vector resolution of the previous CU, and the motion vector of the current CU may be represented in a 2-pixel unit.

In the embodiment as has been described above with reference to FIG. 18, motion vector resolution decoder 1110 adds mv_resolution_delta and the motion vector resolution of the previous CU of the current CU to restore the motion vector resolution of the current CU but the present invention is not limited to hereto. The motion vector resolution decoder 1110 may add the mv_resolution_delta of the current CU and the alternative resolution to decode the motion vector resolution of the current CU.

As an example of an embodiment of FIG. 18, when Adaptive_MV_resolution_enabled_flag and alternative_mv_resolution are located in a Slice (Tile) header (an SPS, a PPS, or a CTU), and mv_resolution_flag and mv_resolution_delta information are located in a header of a CU in a Slice (Tile) (an image sequence, a picture, or a CTU) unit, whether to apply the adaptive motion vector resolution mode according to the present invention and alternative resolution may be enabled depending on an Adaptive_MV_resolution_enabled_flag, and motion vector resolution may be adaptively determined for each CU in a Slice (Tile) (an image sequence, a picture, or a CTU) unit depending on an mv_resolution_flag of each CU, and the motion vector resolution of the current CU may be adjusted using the mv_resolution_delta.

In this case, the mv_resolution_delta of the current CU may be represented as a differential value between an alternative_mv_resolution (i.e., alternative resolution) in a Slice (Tile) header (or an image sequence, a picture, or a CTU) and the motion vector resolution of the current CU. The motion vector resolution decoder 1110 may calculate the motion vector resolution of the current CU by adding the alternative_mv_resolution and the mv_resolution_delta.

For example, when Adaptive_MV_resolution_enabled_flag of a slice header is ON, an alternative_mv_resolution value that is alternative resolution is 4-pixel, default motion vector resolution is ¼-pixel, and mv_resolution_flag that is header information of the current CU is OFF, mv_resolution_delta information may not be required to determine the motion vector resolution of the current CU. In this case, the motion vector resolution of the current CU may be determined as ¼-pixel corresponding to the default motion vector resolution and the motion vector of the current CU may be represented in a ¼-pixel resolution.

When mv_resolution_flag of the current CU is ON and an mv_resolution_delta of the current CU is 0, the motion vector resolution of the current CU may be set as 4-pixel corresponding to a value obtained by adding the alternative_mv_resolution and the mv_resolution_delta, and the motion vector of the current CU may be represented in a 4-pixel resolution. When mv_resolution_flag of the current CU is ON, if the mv_resolution_delta of the current CU is −2 pixel, the motion vector resolution of the current may be set as 2-pixel obtained by adding 4-pixel that is an alternative_mv_resolution of a slice header and −2 pixel corresponding to the mv_resolution_delta, and the motion vector of the current CU may be represented in a 2-pixel resolution.

As another example of the embodiment of FIG. 18, when Adaptive_MV_resolution_enabled_flag and alternative_mv_resolution that is alternative resolution are located in a Slice (Tile) header (or a SPS, a PPS, or a CTU), whether to apply the adaptive motion vector resolution mode according to the present invention and alternative resolution may be determined in units of a slice (Tile) (an image sequence, a picture, or a CTU) depending on an Adaptive_MV_resolution_enabled_flag. When mv_resolution_flag and mv_resolution_delta information are located in a header of a CU in the Slice (Tile) (an image sequence, a picture, or a CTU) unit, motion vector resolution may be adaptively determined for each CU in the Slice (Tile) (an image sequence, a picture, or a CTU) unit depending on an mv_resolution_flag, and the motion vector resolution of the current CU may be adjusted using the mv_resolution_delta.

Here, the mv_resolution_delta of the current CU may be represented as a differential value between an alternative_mv_resolution in the Slice (Tile) header (an SPS, a PPS, or a CTU) and the motion vector resolution of the current CU, or may be represented as a differential value between the motion vector resolution of a CU that is has been encoded immediately prior to the current CU and the motion vector resolution of the current CU.

For example, when the current CU is the first CU in the decoding order, the mv_resolution_delta of the current CU may indicates a differential value between the alternative_mv_resolution in a Slice (Tile) (an SPS, a PPS, or a CTU) header and the motion vector resolution of the current CU. When the current CU is not the first CU, the mv_resolution_delta of the current CU may be represented as a differential value between the motion vector resolution that has been encoded immediately prior to the current CU and the motion vector resolution of the current CU.

For example, when Adaptive_MV_resolution_enabled_flag of the slice header is ON, alternative resolution is 4-pixel, the default motion vector resolution is ¼-pixel, and mv_resolution_flag that is header information of the current CU is OFF, the mv_resolution_delta of the current CU may not be required to determine the motion vector resolution of the current CU. In this case, the motion vector resolution of the current CU may be set as ¼-pixel corresponding to the default motion vector resolution.

On the other hand, when mv_resolution_flag that is header information of the current CU is ON, the current CU is the first CU, and an mv_resolution_delta of the CU is +2 pixel, which indicates a resolution differential value between 4-pixel that is an alternative_mv_resolution in a Slice (Tile) header and motion vector resolution of the current CU, the motion vector resolution of the current CU may be 6-pixel by adding the alternative_mv_resolution 4-pixel and the resolution differential +2 pixel. In this case, when mv_resolution_flag of a next CU of the first CU is ON and an mv_resolution_delta of the corresponding next CU is −2 pixel, motion vector resolution of the corresponding next CU may be 4-pixel by adding 6 pixel that is a motion vector resolution of the previous CU and −2 pixel that is an mv_resolution_delta of the corresponding next CU.

After operations S1847 or S1848 of FIG. 18, the video decoder 1120 may derive the motion vector of the current CU using the MVP (S1850).

Here, operation S1850 may include operations S1851 to S1855.

Operations S1851 to S1855 of FIG. 18 are similar to operations S1251 to S1255 of FIG. 12, respectively, and thus, a detailed description of operations S1851 to S1855 is omitted.

When it is checked in operation S1841 that the encoding mode of the current CU is not an mvp mode, the video decoder 1120 may derive the motion vector of the current CU from the motion vectors (i.e., merge candidates) of temporal or spatial neighboring blocks (S1860).

Here, operation S1860 may include operations S1861 to S1864.

Operations S1861 to S1864 of FIG. 18 are similar to operations S1261 to S1264 of FIG. 12, respectively, and thus, a detailed description of operations S1861 to S1864 is omitted.

FIG. 18 is a flowchart for explanation of an operation of the video decoding apparatus 1100 according to a fourth embodiment of the present invention as well as an operation of the video decoding apparatus 1100 according to the third embodiment of the present invention.

That is, according to the fourth embodiment, the video decoder 1120 may parse mv_resolution_scale instead of mv_resolution_delta from a bitstream and may restore motion vector resolution of the current CU using the parsed mv_resolution_scale.

In the third and fourth embodiments, operations corresponding to operations S1845 to S1846 among operations of FIG. 18 are different each other and the remaining operations are the same.

According to the fourth embodiment, operation S1845 may be embodied to parse mv_resolution_scale from a bitstream and operation S1846 may be embodied to restore motion vector resolution of the current CU using mv_resolution_scale.

When it is checked in operation 1844 that mv_resolution_flag indicates that motion vector resolution of the current CU is determined using a resolution scale factor that is a value obtained by dividing the motion vector resolution of the current CU by the motion vector resolution of the previous CU (i.e., when mv_resolution_flag is ON), the motion vector resolution decoder 1110 may parse, from the bitstream, mv_resolution_scale that is information indicating the value obtained by dividing the motion vector resolution of the current CU by the motion vector resolution of the previous CU (S1845). Alternatively, the mv_resolution_scale may be information indicating a value obtained by dividing the motion vector resolution of the current CU by the alternative resolution.

The motion vector resolution decoder 1110 may calculate the motion vector resolution of the current CU from the mv_resolution_scale (S1846).

In operation S1846, when the current CU is the first CU in the decoding order among CUs in the higher level image unit, the motion vector resolution decoder 1110 may parse motion vector resolution corresponding to the mv_resolution_scale as the motion vector resolution of the current CU. When the current CU is a CU after the first CU in the decoding order, the motion vector resolution decoder 1110 may calculate the motion vector resolution of the current CU by multiplying the motion vector resolution of the CU encoded immediately before the current CU by a scale factor of the current CU. In this case, since the alternative resolution is not required to calculate motion vector resolution of the current CU, the motion vector resolution decoder 1110 may omit an operation of parsing alternative_mv_resolution from a bitstream.

As another embodiment of calculating a motion vector resolution of the current CU from the mv_resolution_scale, the motion vector resolution decoder 1110 may decode a result obtained by multiplying the mv_resolution_scale in the current CU in the higher level image unit by the alternative resolution as the motion vector resolution of the current CU.

As another embodiment of calculating a motion vector resolution of the current CU from the mv_resolution_scale, when the current CU is the first CU in the decoding order among CUs in the higher level image unit, the motion vector resolution decoder 1110 may decode the motion vector resolution of the current CU by multiplying the mv_resolution_scale by an alternative resolution. On the other hand, when the current CU is a CU after the first CU in the decoding order, the motion vector resolution decoder 1110 may calculate the motion vector resolution of the current CU by multiplying the motion vector resolution of a CU that has been encoded immediately prior to the current CU by the mv_resolution_scale of the current CU.

As an example of an operation of the video decoding apparatus 1100 according to the fourth embodiment of the present invention, when Adaptive_MV_resolution_enabled_flag and alternative_mv_resolution are located in a Slice (Tile) header (an SPS, a PPS, or a CTU) and mv_resolution_flag and mv_resolution_scale information are located in a header of the current CU that is an encoding target, the motion vector resolution decoder 1110 may determine, in units of a Slice (Tile) (an image sequence, a picture, or a CTU), whether to apply the adaptive motion vector resolution mode according to the present invention and alternative resolution. The motion vector resolution decoder 1110 may adaptively enabled motion vector resolution in units of a block in a Slice (Tile) (an image sequence, a picture, or a CTU) and adjust motion vector resolution of the current CU using the mv_resolution_scale value.

In this case, when the current CU is a first CU in a slice (Tile) (an image sequence, a picture, or a CTU) that is a higher level image unit, the mv_resolution_scale may be represented as a value corresponding to the motion vector resolution of the current CU, while when the current CU is a CU after the first CU, the mv_resolution_scale may be represented as a multiple value between the motion vector resolution of a CU encoded immediately prior to the current CU and the motion vector resolution of the current CU.

For example, when Adaptive_MV_resolution_enabled_flag of a slice header is ON, default motion vector resolution is ¼-pixel, and mv_resolution_flag that is header information of the current CU is OFF, mv_resolution_scale information of the current CU may not be parsed, and the motion vector resolution of the current CU may be set as ¼-pixel corresponding to the default motion vector resolution.

When mv_resolution_flag of the current CU is ON and the current CU is the first CU in the decoding order, and an mv_resolution_scale of the current CU is 4, the motion vector resolution of the current CU may be 4-pixel corresponding to the mv_resolution_scale. When the current CU is a next CU of the first CU, mv_resolution_flag of the current CU is ON, and an mv_resolution_scale of the current CU is ½, the motion vector resolution of the current CU may be set as 2-pixel by multiplication of 4-pixel of the motion vector resolution of the previous CU and ½ of the mv_resolution_scale of the current CU.

Alternatively, the mv_resolution_scale of each CU may be represented as a multiple value between an alternative_mv_resolution included in a Slice (Tile) header (an SPS, a PPS, or a CTU) and motion vector resolution of the current block.

For example, when Adaptive_MV_resolution_enabled_flag of a slice header is ON, an alternative_mv_resolution value that is alternative resolution is 4 pixel, default motion vector resolution is ¼-pixel, and mv_resolution_flag that is header information of the current CU is OFF, mv_resolution_scale information of the current CU may not be parsed, and the motion vector resolution of the current CU may be set as ¼-pixel corresponding to the default motion vector resolution.

On the other hand, when mv_resolution_flag of the current CU is ON and an mv_resolution_scale of the current CU is 1, motion vector resolution of the current CU may set as 4-pixel by multiplication of 4-pixel that is the alternative_mv_resolution and 1 that is the mv_resolution_scale of the current CU. When mv_resolution_flag of a next CU is ON and an mv_resolution_scale is ½, motion vector resolution of the corresponding next CU may set as 2-pixel by multiplication of 4-pixel that is an alternative resolution and ½ that is an mv_resolution_scale of the next CU.

In another embodiments, an mv_resolution_scale of each CU may be represented by a multiple value between the alternative_mv_resolution in a Slice (Tile) header (an SPS or a PPS) and motion vector resolution of the current CU or may be represented by a multiple value between a motion vector resolution of a CU encoded immediately before the current CU and the motion vector resolution of the current CU. That is, when the current CU is the first CU in the decoding order, an mv_resolution_scale of the current CU may indicate a multiple value between the motion vector resolution of the current CU and the alternative_mv_resolution in a Slice (Tile) header (a SPS or a PPS), while when the current CU is a CU after the first CU, the mv_resolution_scale of the current CU may be represented by a multiple value between the motion vector resolution of the CU encoded immediately before the current CU and the motion vector resolution of the current CU.

For example, when Adaptive_MV_resolution_enabled_flag of a slice header is ON, an alternative_mv_resolution is 4-pixel, default motion vector resolution is ¼-pixel, and mv_resolution_flag that is header information of the current CU is OFF, motion vector resolution of the current CU may not require mv_resolution_scale information, and thus, the motion vector resolution of the current CU may be set as ¼-pixel corresponding to the default motion vector resolution, and the motion vector of the current CU may be represented in a ¼-pixel resolution corresponding to the default motion vector resolution.

On the other hand, when mv_resolution_flag of the current CU is ON and an mv_resolution_scale of the current CU is 1, motion vector resolution of the current CU may be set as 4-pixel by multiplication of 4 pixel that is an alternative_mv_resolution of the slice header and 1 that is an mv_resolution_scale of the current CU. When the current CU is a next CU of the first CU, mv_resolution_flag of the current CU is ON, and an mv_resolution_scale of the current CU is ½, the motion vector resolution of the current CU may be set as 2-pixel by multiplication of 4-pixel that is a motion vector resolution of a CU encoded immediately before the current CU and ½ that is the mv_resolution_scale of the current CU.

Figure 19:
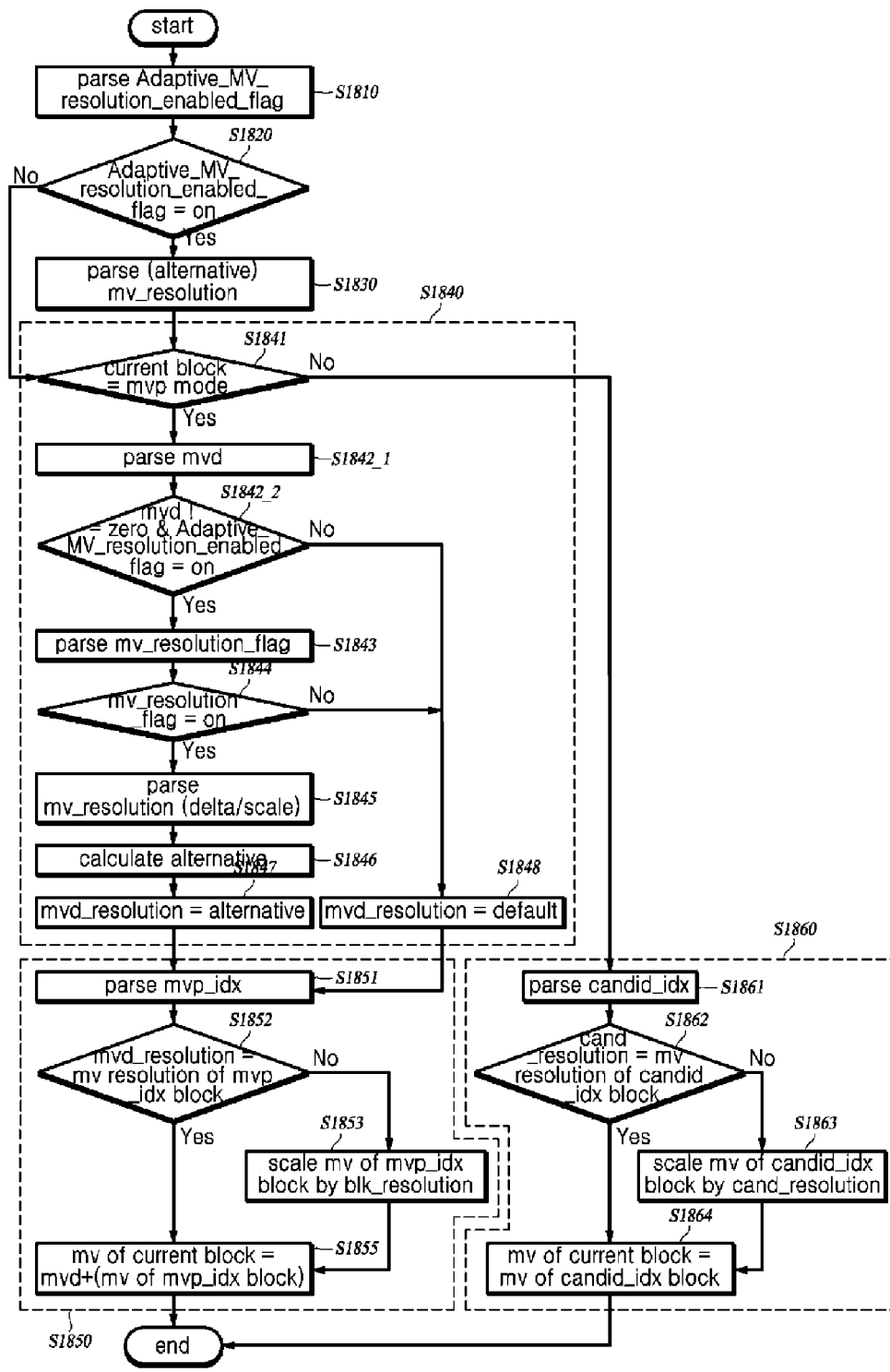
FIG. 19 is a flowchart showing the case in which some operations are added to the flowchart of FIG. 18.

FIG. 19 is a flowchart showing the case in which some operations are added to the flowchart of FIG. 18.

In FIG. 19, operation S1840 may include operations S1841, S18421, S1842_2, S1843, S1844, S1845, S1846, S1847, and S1848. In addition, operation S1850 of FIG. 19 may include operations S1851, S1852, S1853, and S1855.

Compared with the case of FIG. 18, FIG. 19 includes operations S1242_1 and S1242_2 in operation 1240 instead of operation S1242 of FIG. 18 and operation S1854 of FIG. 18 may be excluded from operation S1850.

For reference, among functional blocks of FIG. 19, a functional block with the same reference numeral as a reference numeral of a block of FIG. 18 performs the same operation as the block of FIG. 18 unless it has a clearly different meaning in the context. For example, operation S1843 of FIG. 19 is the same as operation S1843 of FIG. 18.

When it is checked in operation S1841 of FIG. 19 that the encoding mode of the current CU is a mode (i.e., an mvp mode) for encoding a MVD using the MVP, the video decoder 1120 may decode information on the MVD from the bitstream (S1842_1).

After the MVD is decoded, the motion vector resolution decoder 1110 may check whether the MVD is not 0 and whether Adaptive_MV_resolution_enabled_flag is ON (S1842_2). When, as the check result in operation S1842_2, the MVD is not 0 and Adaptive_MV_resolution_enabled_ flag is ON, the motion vector resolution decoder 1110 may proceed to operation S1843. When MVD is 0 or Adaptive_MV_resolution_enabled_flag is not ON, the motion vector resolution decoder 1110 may proceed to operation S1848.

Operation S1851 may be performed prior to operation S1842_1 or may be performed between operations S1842_1 and S1842_2.

Operations S1851, S1852, S1853, and S1855 of FIG. 19 are similar to operations S1251, S1252, S1253, and S1255 of FIG. 14, respectively, and thus, a detailed description of operations S1851, S1852, S1853, and S1855 of FIG. 19 is omitted.

According to embodiments of the present invention, the case in which the motion vector resolution decoder 1110 parses Adaptive_MV_resolution_enabled_flag from a bitstream has been exemplified, but in some embodiments, the motion vector resolution decoder 1110 in the video decoding apparatus 1100 may omit the operation of parsing Adaptive_MV_resolution_enabled_flag from the bitstream. In this case, the motion vector resolution decoder 1110 may perform the same operation as an operation performed when Adaptive_MV_resolution_enabled_flag is ON or may perform the same operation as an operation performed when Adaptive_MV_resolution_enabled_flag is OFF. Correspondingly, the video encoding apparatus 400 may omit the operation of encoding Adaptive_MV_resolution_enabled_flag.

The above embodiments of a video decoding apparatus are not limited to the case where the mv_resolution_flag is parsed in units of a CU, and the mv_resolution_flag may be parsed in units of a CTU to set one of default motion vector resolution or alternative resolution as motion vector resolution. When motion vector resolution is determined in units of a CTU, all CUs included in one CTU may have the same motion vector resolution. In this case, a higher level image unit of a CTU unit may be one of an image sequence, a picture, or a slice.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A video decoding apparatus for decoding a sequence of one or more pictures in the unit of blocks which are split from each picture, the apparatus comprising at least one processor configured to:
   extract, from a header of the sequence in the bitstream, first identification information indicating whether adaptive motion vector difference resolution is allowed in the unit of blocks which belong to the sequence of one or more pictures;
   extract, from the header of the sequence, size information for restricting block splitting in a tree structure which includes a quad-tree and a binary-tree rooted from a leaf node of the quad-tree, the size information including a first syntax element for representing minimum block size allowed for a leaf node of the quad-tree and a second syntax element for representing maximum block size allowed for a root node of the binary-tree;

split a coding tree block in the tree structure by extracting split information under block size restriction defined by the size information, and thereby determine a current block to be decoded;

reconstruct, from a bitstream, a current motion vector difference of the current block among the blocks which belong to the sequence of one or more pictures;

when the first identification information indicates that the adaptive motion vector difference resolution is allowed and the current motion vector difference of the current block is non-zero, extract information on motion vector resolution dedicated to the current block among the blocks which belong to the sequence from the bitstream, and set a resolution of the current motion vector difference of the current block based on the information on motion vector resolution among three or more motion vector resolutions including a ¼ pixel precision;

generate a motion vector of the current block by using the current motion vector difference, the resolution of the current motion vector difference, and a motion vector corresponding to a neighboring block which has been already decoded prior to the current block and is adjacent to the current block; and predict and decode the current block using the motion vector of the current block, wherein the processor is configured to extract the information on motion vector resolution dedicated to the current block by extracting a motion vector (mv) resolution flag dedicated to the current block from the bitstream, the mv resolution flag indicating whether the resolution of the current motion vector difference of the current block is equal to a ¼ pixel precision, and extracting, from the bitstream, alternative motion vector resolution information for representing a motion vector resolution which is dedicated to the current block among motion vector resolutions other than the ¼ pixel precision, only when the mv resolution flag indicates that the resolution of the current motion vector difference of the current block is not the ¼ pixel precision, wherein the alternative motion vector resolution information extracted from the bitstream is a log scale value of a ratio between the resolution of the current motion vector difference of the current block and a resolution of a motion vector difference of a block decoded prior to the current block, wherein, when the current motion vector difference of the current block is zero, the resolution of the current motion vector difference of the current block is set to the ¼ pixel precision without the information on the motion vector resolution extracted, and wherein, the first identification information indicates that the adaptive motion vector difference resolution is not allowed, the resolution of the current motion vector difference of the current block is set to the ¼ pixel precision without the information on motion vector resolution extracted.

2. The apparatus of claim 1, wherein the three or more motion vector resolutions include at least two of ⅛, ½, 1, 2, or 4 pixel precisions.

3. The apparatus of claim 1, wherein the image decoder is configured to convert the motion vector corresponding to the pre-decoded block such that the converted motion vector has the same resolution as the resolution of the current motion vector difference of the current block, and add the current motion vector difference to the converted motion vector to thereby generate the motion vector of the current block.

4. A video encoding apparatus for encoding a sequence of one or more pictures in the units of blocks which are split from each picture, the apparatus comprising one or more processors configured to:

encode, into a header of the sequence in a bitstream, first identification information indicating whether adaptive motion vector difference resolution is allowed in the unit of blocks which belong to the sequence of one or more pictures, encode, into the header of the sequence, size information for restricting block splitting in a tree structure which includes a quad-tree and a binary-tree rooted from a leaf node of the quad-tree, the size information including a first syntax element for representing minimum block size allowed for a leaf node of the quad-tree and a second syntax element for representing maximum block size allowed for a root node of the binary-tree, split a coding tree block in the tree structure under block size restriction defined by the size information to determine a current block to be encoded, and encode split information related to the splitting, determine a current motion vector of the current block among the blocks which belong to the sequence of one or more pictures, generate and encode a current motion vector difference of the current block by using the current motion vector of the current block and a motion vector corresponding to a neighboring block which has been already encoded prior to the current block and is adjacent to the current block, when the first identification information indicates that the adaptive motion vector difference resolution allowed and the current motion vector difference is non-zero, encode information on motion vector resolution dedicated to the current block among the blocks which belong to the sequence, wherein the information on motion vector resolution is used for representing a resolution at which the current motion vector difference is encoded among three or more motion vector resolutions including a ¼ pixel precision, and predict and encode the current block using the current motion vector of the current block, wherein the information on motion vector resolution is encoded by:

encoding a motion vector (mv) resolution flag dedicated to the current block, the my resolution flag indicating whether the resolution of the current motion vector difference of the current block is equal to the ¼ pixel precision, and encoding alternative motion vector resolution information for representing a motion vector resolution which is dedicated to the current block among motion vector resolutions other than the ¼ pixel precision, only when the mv resolution flag indicates that the resolution of the current motion vector difference of the current block is not the ¼ pixel precision, wherein the alternative motion vector resolution information to be encoded is a log scale value of a ratio between the resolution of the current motion vector difference of the current block and a resolution of a motion vector difference of a block encoded prior to the current block, wherein, when the current motion vector difference of the current block is zero, the information on motion vector resolution is not encoded such that the ¼ pixel precision is used as the resolution of the current motion vector difference of the current block, and wherein, when the first identification information indicates that the adaptive motion vector difference resolution is not allowed, the resolution of the current motion vector difference of the current block is encoded at the ¼ pixel precision without the information on motion vector resolution encoded.

5. The apparatus of claim 4, wherein the three or more motion vector resolutions include at least two of ⅛, ½, 1, 2, or 4 pixel precisions.

6. The apparatus of claim 4, wherein the current motion vector difference of the current block is generated by:
converting the motion vector corresponding to the pre-decoded block such that the converted motion vector has the same resolution as the resolution of the current motion vector difference of the current block, and
adding the current motion vector difference to the converted motion vector.

7. A method for transmitting a bitstream containing encoded video data, the method comprising:
generating the bitstream by encoding a sequence of one or more pictures in the units of blocks which are split from each picture; and
transmitting the bitstream to a video decoding apparatus, wherein generating the bitstream comprises:
encoding, into a header of the sequence in a bitstream, first identification information indicating whether adaptive motion vector difference resolution is allowed in the unit of blocks which belong to the sequence of one or more pictures,
encoding, into the header of the sequence, size information for restricting block splitting in a tree structure which includes a quad-tree and a binary-tree rooted from a leaf node of the quad-tree, the size information including a first syntax element for representing minimum block size allowed for a leaf node of the quad-tree and a second syntax element for representing maximum block size allowed for a root node of the binary-tree,
splitting a coding tree block in the tree structure under block size restriction defined by the size information to determine a current block to be encoded, and encoding split information related to the splitting,
determining a current motion vector of the current block among the blocks which belong to the sequence of one or more pictures,
generating and encoding a current motion vector difference of the current block by using the current motion vector of the current block and a motion vector corresponding to a neighboring block which has been already encoded prior to the current block and is adjacent to the current block,
when the first identification information indicates that the adaptive motion vector difference resolution is allowed and the current motion vector difference is non-zero, encoding information on motion vector resolution dedicated to the current block among the blocks which belong to the sequence, wherein the information on motion vector resolution is used for representing a resolution at which the current motion vector difference is encoded among three or more motion vector resolutions including a ¼ pixel precision, and
predicting and encoding the current block using the current motion vector of the current block,
wherein the information on motion vector resolution is encoded by:
encoding a motion vector (mv) resolution flag dedicated to the current block, the mv resolution flag indicating whether the resolution of the current motion vector difference of the current block is equal to the ¼ pixel precision, and
encoding alternative motion vector resolution information for representing a motion vector resolution which is dedicated to the current block among motion vector resolutions other than the ¼ pixel precision, only when the mv resolution flag indicates that the resolution of the current motion vector difference of the current block is not the ¼ pixel precision,
wherein the alternative motion vector resolution information is a log scale value of a ratio between the resolution of the current motion vector difference of the current block and a resolution of a motion vector difference of a block encoded prior to the current block,
wherein, when the current motion vector difference of the current block is zero, the information on motion vector resolution is not encoded such that the ¼ pixel precision is used as the resolution of the current motion vector difference of the current block, and
wherein, when the first identification information indicates that the adaptive motion vector difference resolution is not allowed, the resolution of the current motion vector difference of the current block is encoded at the ¼ pixel precision without the information on motion vector resolution encoded.

\* \* \* \* \*